US011255789B2

(12) United States Patent
Fukuzawa et al.

(10) Patent No.: US 11,255,789 B2
(45) Date of Patent: Feb. 22, 2022

(54) REACTION PROCESSING APPARATUS

(71) Applicant: Nippon Sheet Glass Company, Limited, Tokyo (JP)

(72) Inventors: Takashi Fukuzawa, Tokyo (JP); Hidemitsu Takeuchi, Tokyo (JP); Osamu Kawaguchi, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 17/028,331

(22) Filed: Sep. 22, 2020

(65) Prior Publication Data
US 2021/0088445 A1  Mar. 25, 2021

Related U.S. Application Data

(63) Continuation of application No. PCT/JP2019/009902, filed on Mar. 12, 2019.

(30) Foreign Application Priority Data

Mar. 23, 2018 (JP) .............................. JP2018-056767

(51) Int. Cl.
*G01N 21/64* (2006.01)

(52) U.S. Cl.
CPC . *G01N 21/6452* (2013.01); *G01N 2021/6419* (2013.01); *G01N 2021/6421* (2013.01);
(Continued)

(58) Field of Classification Search
CPC ....... G01N 21/6452; G01N 2021/6419; G01N 2021/6421; G01N 2021/6471; G01N 2021/6484
(Continued)

(56) References Cited

U.S. PATENT DOCUMENTS

| 2012/0219029 A1 | 8/2012 | Scott et al. |
| 2017/0131206 A1 | 5/2017 | Li et al. |
| 2018/0311673 A1* | 11/2018 | Fukuzawa ................ C12M 1/00 |

FOREIGN PATENT DOCUMENTS

| JP | 2008532526 A | 8/2008 |
| JP | 2009232700 A | 10/2009 |

(Continued)

OTHER PUBLICATIONS

International Search Report dated May 21, 2019 from the International Searching Authority in International Application No. PCT/JP2019/009902.

(Continued)

*Primary Examiner* — David P Porta
*Assistant Examiner* — Gisselle M Gutierrez
(74) *Attorney, Agent, or Firm* — Sughrue Mion, PLLC

(57) ABSTRACT

A reaction processing apparatus includes: a reaction processing vessel; a first fluorescence detection device that irradiates a sample with first excitation light and detects first fluorescence produced from the sample; and a second fluorescence detection device that irradiates a sample with second excitation light and detects second fluorescence produced from the sample. The wavelength range of the first fluorescence and the wavelength range of the second excitation light overlap at least partially. The first excitation light and the second excitation light flash at a predetermined duty ratio d. The phase difference between the flashing of the first excitation light and the flashing of the second excitation light is set within a range of $2\pi(pm-\Delta pm)$ (rad) to $2\pi(pm+\Delta pm)$ (rad) or within a range of $2\pi[(1-pm)-\Delta pm]$ (rad) to $2\pi[(1-pm)+\Delta pm]$ (rad), where $pm=d-d2$ and $\Delta pm=0.01*pm$.

9 Claims, 19 Drawing Sheets

Specification includes a Sequence Listing.

(52) U.S. Cl.
CPC ............... *G01N 2021/6471* (2013.01); *G01N 2021/6484* (2013.01)

(58) Field of Classification Search
USPC ........................................................ 250/581
See application file for complete search history.

(56) References Cited

FOREIGN PATENT DOCUMENTS

| WO | 2009/098624 A1 | 8/2009 |
|----|----------------|--------|
| WO | 2014014016 A1  | 1/2014 |
| WO | 2017119382 A1  | 7/2017 |

OTHER PUBLICATIONS

International Preliminary Report on Patentability dated Oct. 8, 2020 from the International Bureau in International Application No. PCT/JP2019/009902.

Extended European Search Report dated Oct. 26, 2021 from the European Patent Office in EP Application No. 19771562.6.

\* cited by examiner

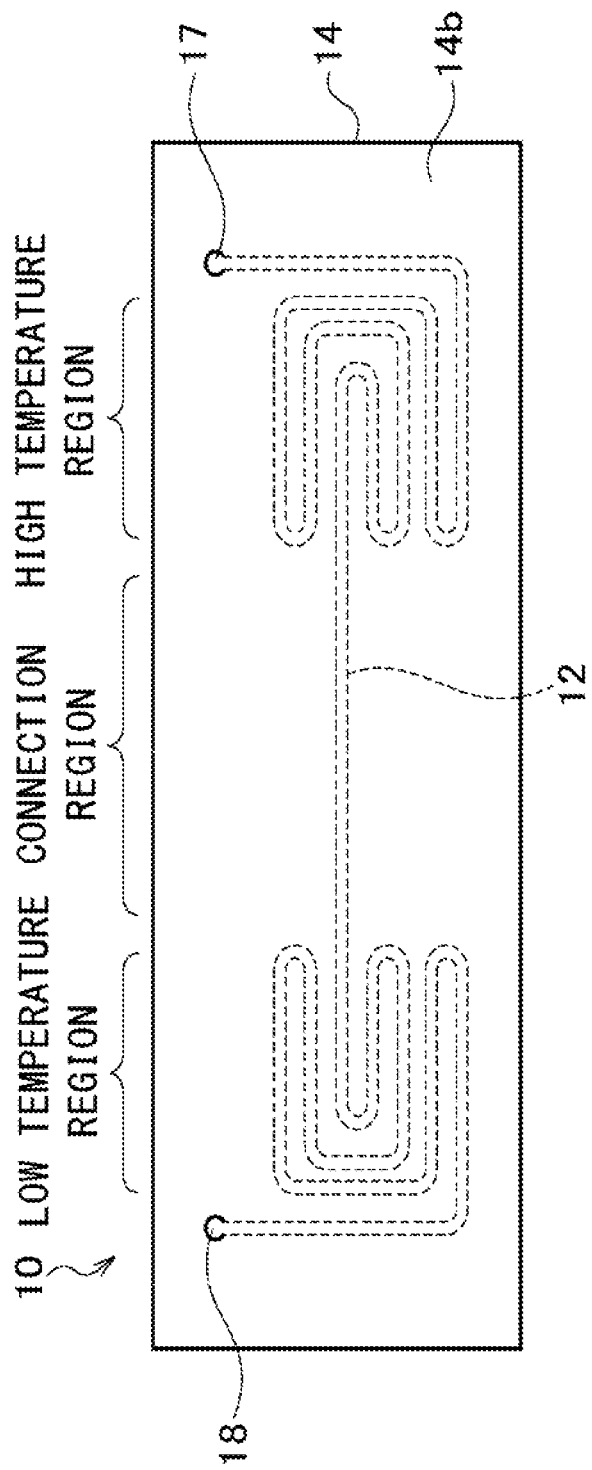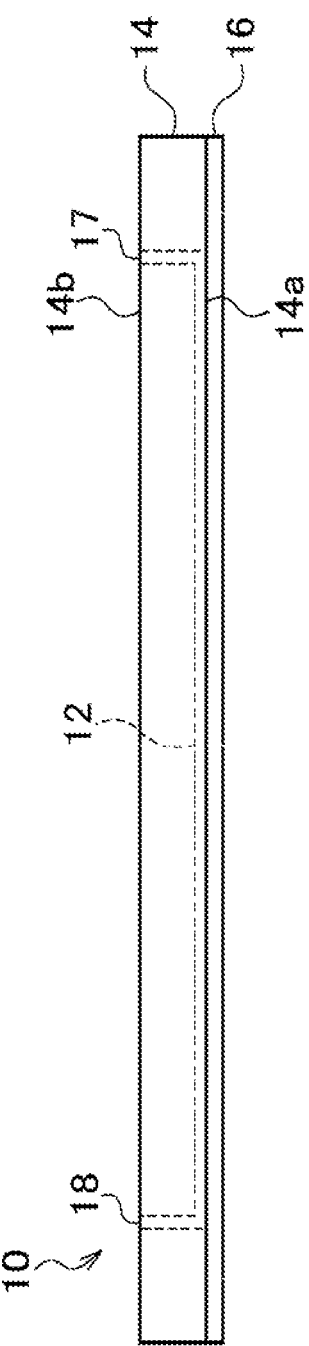

REACTION PROCESSING APPARATUS

BACKGROUND OF THE INVENTION

1. Field of the Invention

The present invention relates to reaction processing apparatuses used for polymerase chain reactions (PCR).

BACKGROUND ART

Genetic testing is widely used for examinations in a wide variety of medical fields, identification of farm products and pathogenic microorganisms, safety assessment for food products, and even for examinations for pathogenic viruses and a variety of infectious diseases. In order to detect with high sensitivity a minute amount of DNA, methods of analyzing the resultant obtained by amplifying a portion of DNA are known. Above all, a method that uses PCR is a remarkable technology where a certain portion of a very small amount of DNA collected from an organism or the like is selectively amplified.

In PCR, a predetermined thermal cycle is applied to a sample in which a biological sample containing DNA and a PCR reagent consisting of primers, enzymes, and the like are mixed so as to cause denaturation, annealing, and elongation reactions to be repeated so that a specific portion of DNA is selectively amplified.

It is a common practice to perform PCR by putting a predetermined amount of a target sample into a PCR tube or a reaction processing vessel such as a microplate (microwell) in which a plurality of holes are formed. However, in recent years, PCR using a reaction processing vessel (also referred to as "chip") provided with a micro-channel that is formed on a substrate is practiced (e.g. Patent Document 1).

[Patent Document 1] Japanese Patent Application Publication No. 2009-232700

SUMMARY OF THE INVENTION

In PCR where a reaction processing vessel provided with a channel such as the one described above, a fluorescence detection device may be used for the purpose of, e.g., detecting a quantitative change of a sample. A fluorescent dye is added to the sample, and excitation light is applied to the sample using a fluorescence detection device during PCR so as to detect fluorescence emitted from the sample. Since the intensity of fluorescence emitted from the sample increases as the amplification of the DNA proceeds, the intensity value of the fluorescence can be used as an index serving as a decision material for the progress of the PCR or the termination of the reaction.

In PCR, a reagent in which a plurality of fluorescent dyes are mixed is often used depending on an amplification target, and in this case, it is necessary to install a plurality of fluorescence detection devices. In particular, in a reaction processing apparatus that detects fluorescence from a sample while moving the sample in a channel formed inside a plate-like reaction processing vessel, in order to detect fluorescence from a sample passing through a single channel whose cross-sectional area is, for example, 2 mm² or less, it is necessary to arrange a plurality of fluorescence detection devices in the extending direction of the channel.

For example, when amplifying O-157 by PCR, VT1 and VT2 are measured at the same time. For example, a test kit (FIK-362) by Toyobo Co., Ltd., uses ROX (a fluorescent dye that is excited by irradiation with substantially green light and emits substantially red fluorescence, and hereinafter, such a characteristic of fluorescence is referred to as "green excitation/red fluorescence") and Cy5 (red excitation/infrared fluorescence). In this case, two fluorescence detection devices are necessary.

When detecting norovirus, G1 and G2 are to be measured simultaneously. For example, a test kit (RR255A) by Takara Bio Inc., and a test kit (FIK-253) by Toyobo Co., Ltd., both use FAM (blue excitation/green fluorescence), ROX (green excitation/red fluorescence), and Cy5 (red excitation/infrared fluorescence) as fluorescent dyes. In this case, three fluorescence detection devices are necessary.

When fluorescence detection is performed on a sample that passes through a channel using a plurality of fluorescence detection devices as described above, interference may occur between the fluorescence detection devices. An explanation will be given using examples in the following.

When FAM and ROX are used while being added to a sample at the same time as fluorescent dyes, the wavelength range of light corresponding to the substantially green color of excitation light radiated to excite the ROX and the wavelength range of light corresponding to the substantially green color of excitation light emitted from the FAM may partially overlap. In that case, when a part of the excitation light radiated to excite the ROX enters a photodetector such as a photoelectric conversion element for detecting fluorescence emitted from the FAM, the part of the excitation light becomes noise, and highly sensitive measurement may not be able to be performed. Normally, the amount of excitation light is several tens of μW, while the amount of fluorescence to be detected is on the order of several pW or less. This is because fluorescence detection devices are configured to detect such a weak amount of fluorescence and even a small part of excitation light that reaches the photodetector appears as large noise.

When ROX and Cy5 are used while being added to a sample at the same time as fluorescent dyes, the wavelength range of substantially red light of excitation light radiated to excite the Cy5 and the wavelength range of light corresponding to the substantially red color of fluorescence emitted from the ROX may partially overlap. In that case also, when a part of the excitation light radiated to excite the Cy5 enters a photodetector for detecting fluorescence emitted from the ROX, the part of the excitation light becomes noise, and highly sensitive fluorescence measurement may not be able to be performed.

In this background, a purpose of the present invention is to provide a technology capable of suppressing interference between fluorescence detection devices in a reaction processing apparatus provided with a plurality of fluorescence detection devices.

A reaction processing apparatus according to one embodiment of the present invention includes: a reaction processing vessel in which a channel where a sample moves is formed; a first fluorescence detection device that irradiates a sample inside a first fluorescence detection region set in the channel with first excitation light and also detects first fluorescence produced from the sample by the irradiation with the first excitation light; and a second fluorescence detection device that irradiates a sample inside a second fluorescence detection region set in the channel with second excitation light and also detects second fluorescence produced from the sample by the irradiation with the second excitation light. The wavelength range of the first fluorescence and the wavelength range of the second excitation light overlap with each other at least partially. The first excitation light and the second excitation light flash at a predetermined duty ratio, and given that the duty ratio of the flashing of the first excitation light and the flashing of the second excitation light is d, the phase difference between the flashing of the first excitation light and the flashing of the second excitation light is set within a range of $2\pi(p_m-\Delta p_m)$ (rad) to $2\pi(p_m+\Delta p_m)$ (rad) or within a range of $2\pi[(1-p_m)-\Delta p_m]$ (rad) to $2\pi[(1-p_m)+\Delta p_m]$ (rad), where $p_m=d-d^2$ and $\Delta p_m=0.01*p_m$.

Another embodiment of the present invention also relates to a reaction processing apparatus. This apparatus includes: a reaction processing vessel in which a channel where a sample moves is formed; a first fluorescence detection device that irradiates a sample inside a first fluorescence detection region set in the channel with first excitation light and also detects first fluorescence produced from the sample by the irradiation with the first excitation light; and a second fluorescence detection device that irradiates a sample inside a second fluorescence detection region set in the channel with second excitation light and also detects second fluorescence produced from the sample by their radiation with the second excitation light. The wavelength range of the first fluorescence and the wavelength range of the second excitation light overlap with each other at least partially, and the first excitation light and the second excitation light flash at a predetermined duty ratio. Given that the duty ratio of the flashing of the first excitation light and the flashing of the second excitation light is d, the phase difference between the flashing of the first excitation light and the flashing of the second excitation light is set within a range of $2\pi(p_m-\Delta p_m)$ (rad) to $2\pi(p_m+\Delta p_m)$ (rad) or within a range of $2\pi[(1-p_m)-\Delta p_m]$ (rad) to $2\pi[(1-p_m)+\Delta p_m]$ (rad), where $p_m=d-d^2$ and $\Delta p_m=(d-d^2)/[k*(N_o')/V^1{}_0]$, $N_o'$ represents noise of a signal output of the first fluorescence detection device when the phase difference between the flashing of the first excitation light and the flashing of the second excitation light is 0 rad, $V^1{}_0$ represents a signal output of the first fluorescence detection device when the second fluorescence detection device is not operating, and k is 20.

In the above embodiment, k may be 100/3. Alternatively, k may be 100.

The first fluorescence detection device may include a first optical head that emits the first excitation light and receives the first fluorescence. The second fluorescence detection device may include a second optical head that emits the second excitation light and receives the second fluorescence. When the respective numerical apertures of the first optical head and the second optical head are in a range of 0.07 to 0.23, the distance between the center of the first fluorescence detection region and the center of the second fluorescence detection region may be set to 4 mm or more.

The channel may include a first temperature region maintained at a first temperature, a second temperature region maintained at a second temperature higher than the first temperature, and a connection region connecting the first temperature region and the second temperature region. The movement of a sample inside the channel may be controlled based on a fluorescence signal detected by the first fluorescence detection device. The first fluorescence detection region may be set at a substantially intermediate point of the connection region.

The first fluorescence detection device may emit blue light as the first excitation light and detect green light as the first fluorescence. The second fluorescence detection device may emit green light as the second excitation light and detect red light as the second fluorescence.

The reaction processing apparatus may further include: a third fluorescence detection device that irradiates a sample inside a third fluorescence detection region set in the channel with third excitation light and also detects third fluorescence produced from the sample by the irradiation with the third excitation light. The third fluorescence detection device may emit red light as the third excitation light and detect infrared light as the third fluorescence.

A first optical head of the first fluorescence detection device may be arranged in the center, and a second optical head of the second fluorescence detection device and a third optical head of the third fluorescence detection device may be arranged on the respective sides of the first optical head.

BRIEF DESCRIPTION OF THE DRAWINGS

Embodiments will now be described, by way of example only, with reference to the accompanying drawings which are meant to be exemplary, not limiting, and wherein like elements are numbered alike in several FIGS., in which:

FIGS. 1A and 1B are diagrams for explaining a reaction processing vessel usable in a reaction processing apparatus according to an embodiment of the present invention;

DETAILED DESCRIPTION OF THE INVENTION

Figure 2:
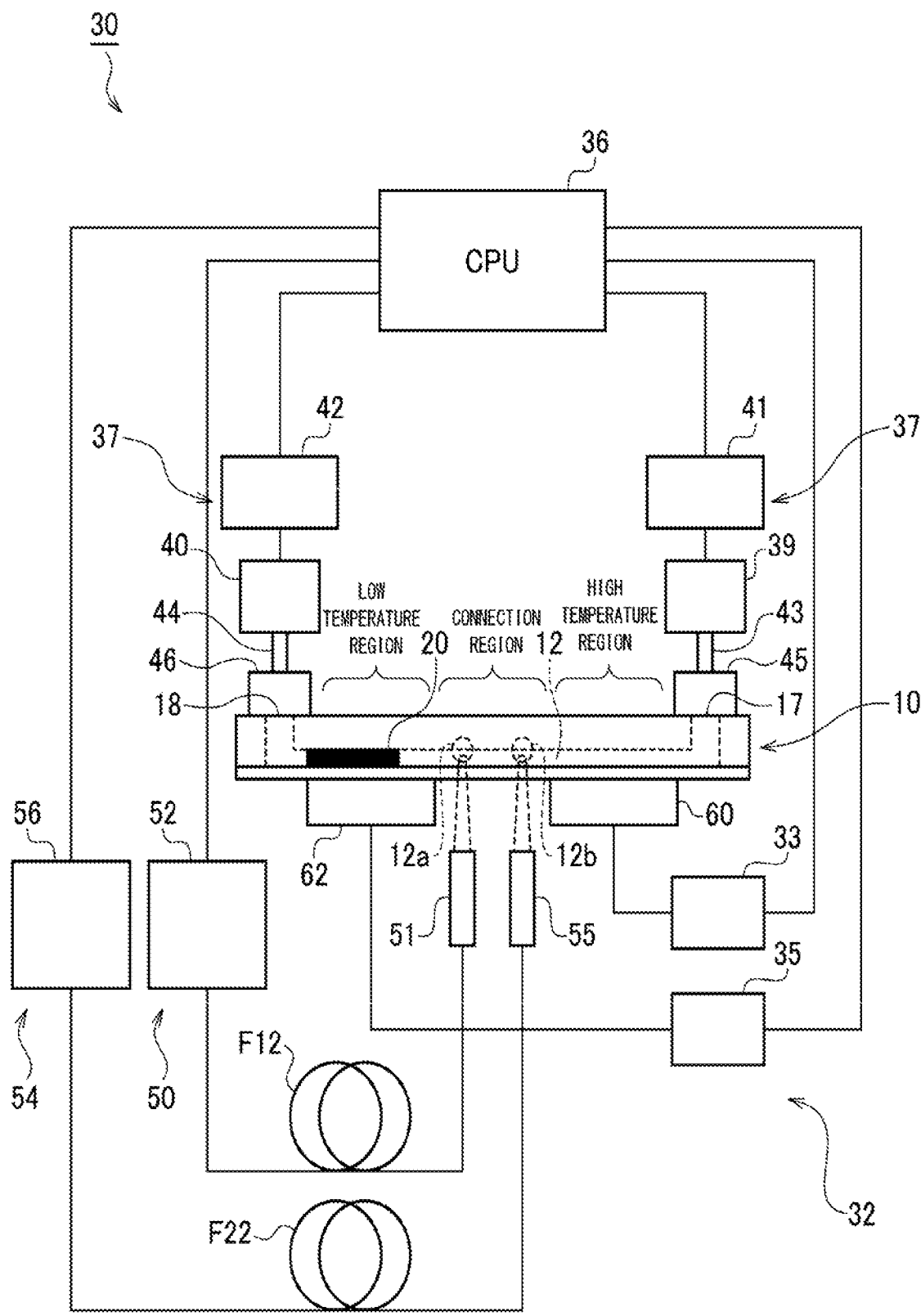
FIG. 2 is a schematic diagram for explaining the reaction processing apparatus according to the embodiment of the present invention.

An explanation will be given in the following regarding a reaction processing apparatus according to an embodiment of the present invention. The same or equivalent constituting elements, members, and processes illustrated in each drawing shall be denoted by the same reference numerals, and duplicative explanations will be omitted appropriately. Further, the embodiments do not limit the invention and are shown for illustrative purposes, and not all the features described in the embodiments and combinations thereof are necessarily essential to the invention.

FIGS. 1A and 1B are diagrams for explaining a reaction processing vessel 10 usable in a reaction processing apparatus according to an embodiment of the present invention. FIG. 1A is a plan view of the reaction processing vessel 10, and FIG. 1B is a front view of the reaction processing vessel 10.

As shown in FIGS. 1A and 1B, the reaction processing vessel 10 comprises a substrate 14 and a channel sealing film 16.

The substrate 14 is preferably formed of a material that is stable under temperature changes and is resistant to a sample solution that is used. Further, the substrate 14 is preferably formed of a material that has good moldability, a good transparency and barrier property, and a low self-fluorescence property. As such a material, an inorganic material such as glass, silicon (Si), or the like, a resin such as acrylic, polypropylene, polyester, silicone, or the like, and particularly cycloolefin are preferred. An example of the dimensions of the substrate 14 includes a long side of 75 mm, a short side of 25 mm, and a thickness of 4 mm.

A groove-like channel 12 is formed on the lower surface 14a of the substrate 14, and this channel 12 is sealed by the channel sealing film 16. An example of the dimensions of the channel 12 formed on the lower surface 14a of the substrate 14 includes a width of 0.7 mm and a depth of 0.7 mm. A first communication port 17, which communicates with the outside, is formed at the position of one end of the channel 12 in the substrate 14. A second communication port 18 is formed at the position of the other end of the channel 12 in the substrate 14. The pair, the first communication port 17 and the second communication port 18, formed on the respective ends of the channel 12 is formed so as to be exposed on the upper surface 14b of the substrate 14. Such a substrate can be produced by injection molding or cutting work with an NC processing machine or the like.

As shown in FIG. 1B, on the lower surface 14a of the substrate 14, the channel sealing film 16 is attached. In the reaction processing vessel 10 according to the embodiment, most of the channel 12 is formed in the shape of a groove exposed on the lower surface 14a of the substrate 14. This is for allowing for easy molding by injection molding using a metal mold or the like. In order to seal this groove so as to make use of the groove as a channel, the channel sealing film 16 is attached on the lower surface 14a of the substrate 14.

The channel sealing film 16 may be sticky and/or adhesive on one of the main surfaces thereof or may have a functional layer that exhibits stickiness and/or adhesiveness through pressing, energy irradiation with ultraviolet rays or the like, heating, etc., formed on one of the main surfaces. Thus, the channel sealing film 16 has a function of being easily able to become integral with the lower surface 14a of the substrate 14 while being in close contact with the lower surface 14a. The channel sealing film 16 is desirably formed of a material, including an adhesive, that has a low self-fluorescence property. In this respect, a transparent film made of a resin such as cycloolefin, polyester, polypropylene, polyethylene or acrylic is suitable but is not limited thereto. Further, the channel sealing film 16 may be formed of a plate-like glass or resin. Since rigidity can be expected in this case, the channel sealing film 16 is useful for preventing warpage and deformation of the reaction processing vessel 10.

The channel 12 is provided with a reaction region where the control of temperatures of a plurality of levels is possible by a reaction processing apparatus described later. A thermal cycle can be applied to a sample by moving the sample such that the sample continuously reciprocates in the reaction region where the temperatures of a plurality of levels are maintained.

The reaction region of the channel 12 shown in FIGS. 1A and 1B includes a serpiginous shape channel where a turn is continuously made by combining curved portions and straight portions. When the reaction processing vessel 10 is mounted on a reaction processing apparatus described later, the right side of the channel 12 in the figures is expected to become a region of a relatively high temperature (about 95° C.) (herein after referred to as "high temperature region"), and the left side of the channel 12 is expected to become a region of a lower temperature (about 60° C.) (hereinafter referred to as "low temperature region"). Further, the reaction region of the channel 12 includes a connection region for connecting the high temperature region and the low temperature region therebetween. This connection region may be a linear channel.

When the high temperature region and the low temperature region are serpiginous shape channels as in the present embodiment, the effective area of a heater or the like constituting a temperature control means described later can be effectively used, and there are advantages that temperature variance in the reaction region is easily reduced and that the substantial size of the reaction processing vessel can be reduced, allowing the reaction processing apparatus to be made small.

The sample subjected to a thermal cycle is introduced into the channel 12 through either one of the first communication port 17 and the second communication port 18. The method for the introduction is not limited to this. Alternatively, for example, an appropriate amount of the sample may be directly introduced through the communication port using a pipette, a dropper, a syringe, or the like. Alternatively, a method of introduction may be used that is performed while preventing contamination via a cone-shaped needle chip, in which a filter made of porous PTFE or polyethylene is incorporated. In general, many types of such needle chips are sold and can be obtained easily, and the needle chips can be used while being attached to the tip of a pipette, a dropper, a syringe, or the like. Furthermore, the sample may be moved to a predetermined position in the channel by discharging and introducing the sample by a pipette, a dropper, a syringe, or the like and then further pushing the sample through pressurization.

The sample includes, for example, those obtained by adding a fluorescent dye, a thermostable enzyme and four types of deoxyribonucleoside triphosphates (dATP, dCTP, dGTP, dTTP) as PCR reagents to a mixture containing one or more types of DNA. Further, a primer that specifically reacts with the DNA subjected to reaction processing, and in some cases, a fluorescent probe such as TaqMan (TaqMan is a registered trademark of Roche Diagnostics Gesellschaft mit beschränkter Haftung) are mixed. Commercially available real-time PCR reagent kits and the like can be also used.

FIG. 2 is a schematic diagram for explaining a reaction processing apparatus 30 according to the embodiment of the present invention.

The reaction processing apparatus 30 according to the embodiment is provided with a reaction processing vessel placing portion (not shown) on which the reaction processing vessel 10 is placed, a temperature control system 32, and a CPU 36. As shown in FIG. 2, relative to the reaction processing vessel 10 placed on the reaction processing vessel placing portion, the temperature control system 32 is configured so as to be able to accurately maintain and control the temperature of the right side region of the channel 12 of the reaction processing vessel 10 in the figure to be about 95° C. (high temperature range) and the temperature of the left side region thereof in the figure to be about 60° C. (low temperature range).

The temperature control system 32 is for maintaining the temperature of each temperature region of the reaction region and is specifically provided with a high temperature heater 60 for heating the high temperature region of the channel 12, a low temperature heater 62 for heating the low temperature region of the channel 12, a temperature sensor (not shown) such as, for example, a thermocouple or the like for measuring the actual temperature of each temperature region, a high temperature heater driver 33 for controlling the temperature of the high temperature heater 60, and a low temperature heater driver 35 for controlling the temperature of the low temperature heater 62. Information on the actual temperature measured by the temperature sensor is sent to the CPU 36. Based on the information on the actual temperature of each temperature region, the CPU 36 controls each heater driver such that the temperature of each heater becomes a predetermined temperature. Each heater may be, for example, a resistance heating element, a Peltier element, or the like. The temperature control system 32 may be further provided with other components for improving the temperature controllability of each temperature region.

The reaction processing apparatus 30 according to the present embodiment is further provided with a liquid feeding system 37 for moving, inside the channel 12, the sample 20 introduced into the channel 12 of the reaction processing vessel 10. The liquid feeding system 37 is provided with a first pump 39, a second pump 40, a first pump driver 41 for driving the first pump 39, a second pump driver 42 for driving the second pump 40, a first tube 43, and a second tube 44.

One end of the first tube 43 is connected to the first communication port 17 of the reaction processing vessel 10. A packing material 45 or a seal for securing airtightness is preferably arranged at the junction of the first communication port 17 and the end of the first tube 43. The other end of the first tube 43 is connected to the output of the first pump 39. In the same way, one end of the second tube 44 is connected to the second communication port 18 of the reaction processing vessel 10. A packing material 46 or a seal for securing airtightness is preferably arranged at the junction of the second communication port 18 and the end of the second tube 44. The other end of the second tube 44 is connected to the output of the second pump 40.

The first pump 39 and the second pump 40 may be, for example, micro blower pumps each comprising a diaphragm pump. As the first pump 39 and the second pump 40, for example, micro blower pumps (MZB1001 T02 model) manufactured by Murata Manufacturing Co., Ltd., or the like can be used. While this micro blower pump can increase the pressure on a secondary side to be higher than a primary side during operation, the pressure on the primary side and the pressure on the secondary side become equal at the moment when the pump is stopped or when the pump is stopped.

The CPU 36 controls the air supply and pressurization from the first pump 39 and the second pump 40 via the first pump driver 41 and the second pump driver 42. The air supply and pressurization from the first pump 39 and the second pump 40 act on the sample 20 inside the channel through the first communication port 17 and the second communication port 18 and becomes a propulsive force to move the sample 20. More specifically, by alternately operating the first pump 39 and the second pump 40, the pressure applied to either end surface of the sample 20 becomes larger than the pressure applied to the other end, and a propulsive force relating to the movement of the sample 20 can thus be obtained. By alternately operating the first pump 39 and the second pump 40, the sample 20 can be moved in a reciprocating manner in the channel so as to pass through each temperature region of the channel 12 of the reaction processing vessel 10. As a result, a thermal cycle can be applied to the sample 20. More specifically, target DNA in the sample 20 is selectively amplified by repeatedly applying a step of denaturation in the high temperature region and a step of annealing and elongation in the low temperature region. In other words, the high temperature region can be considered to be a denaturation temperature region, and the low temperature region can be considered to be an annealing and elongation temperature region. The time for staying in each temperature region can be appropriately set by changing the time during which the sample 20 stops at a predetermined position in each temperature region.

The reaction processing apparatus 30 according to the embodiment is further provided with a first fluorescence detection device 50 and a second fluorescence detection device 54. As described above, a predetermined fluorescent dye is added to the sample 20. Since the intensity of a fluorescence signal emitted from the sample 20 increases as the amplification of the DNA proceeds, the intensity value of the fluorescence signal can be used as an index serving as a decision material for the progress of the PCR or the termination of the reaction.

As the first fluorescence detection device 50 and the second fluorescence detection device 54, optical fiber-type fluorescence detectors FLE-510 manufactured by Nippon Sheet Glass Co., Ltd., can be used, which are very compact optical systems that allow for rapid measurement and the detection of fluorescence regardless of whether the place is a lighted place or a dark place. These optical fiber-type fluorescence detectors allow the wavelength characteristic of the excitation light/fluorescence to be tuned such that the wavelength characteristic is suitable for the characteristic of fluorescence emitted from the sample 20 and thus allow an optimum optical and detection system for a sample having various characteristics to be provided. Further, the optical fiber-type fluorescence detectors are suitable for detecting fluorescence from a sample existing in a small or narrow region such as a channel because of the small diameter of a ray of light brought by the optical fiber-type fluorescence detectors.

The first fluorescence detection device 50 is provided with a first optical head 51, a first fluorescence detection excitation light source/detector module 52, and an optical fiber F12 connecting the first optical head 51 and the first fluorescence detection excitation light source/detector module 52. In the same manner, the second fluorescence detection device 54 is provided with a second optical head 55, a second fluorescence detection excitation light source/detector module 56, and an optical fiber F22 connecting the second optical head 55 and the second fluorescence detection excitation light source/detector module 56.

The first fluorescence detection excitation light source/detector module 52 and the second fluorescence detection excitation light source/detector module 56 each include a light source for excitation light, a wavelength multiplexer/demultiplexer, a fluorescence detector, and a driver or the like for controlling these. Each of the first optical head 51 and the second optical head 55 is formed of an optical system such as a lens and has a function of directionally irradiating the sample with excitation light and collecting fluorescence emitted from the sample. Fluorescence condensed by the first optical head 51 and fluorescence collected by the second optical head 55 are separated from excitation light by the respective wavelength multiplexers/demultiplexers in the first fluorescence detection excitation light source/detector module 52 and the second fluorescence detection excitation light source/detector module 56 via the optical fibers F12 and F22, respectively, and are converted into electric signals by the respective fluorescence detectors. The details of the configuration of the fluorescence detection devices will be described later.

In the reaction processing apparatus 30 according to the present embodiment, the first optical head 51 is arranged such that fluorescence from the sample 20 passing through a partial region 12a (referred to as "first fluorescence detection region 12a") inside the connection region connecting the high temperature region and the low temperature region can be detected. Further, the second optical head 55 is arranged such that fluorescence can be detected from the sample 20 passing through another partial region 12b (referred to as "second fluorescence detection region 12b") inside the connection region. Since the reaction progresses while the sample 20 is repeatedly moved in a reciprocating manner in the channel such that predetermined DNA contained in the sample 20 is amplified, by monitoring a change in the amount of detected fluorescence, the progress of the DNA amplification can be learned in real time.

Figure 3:
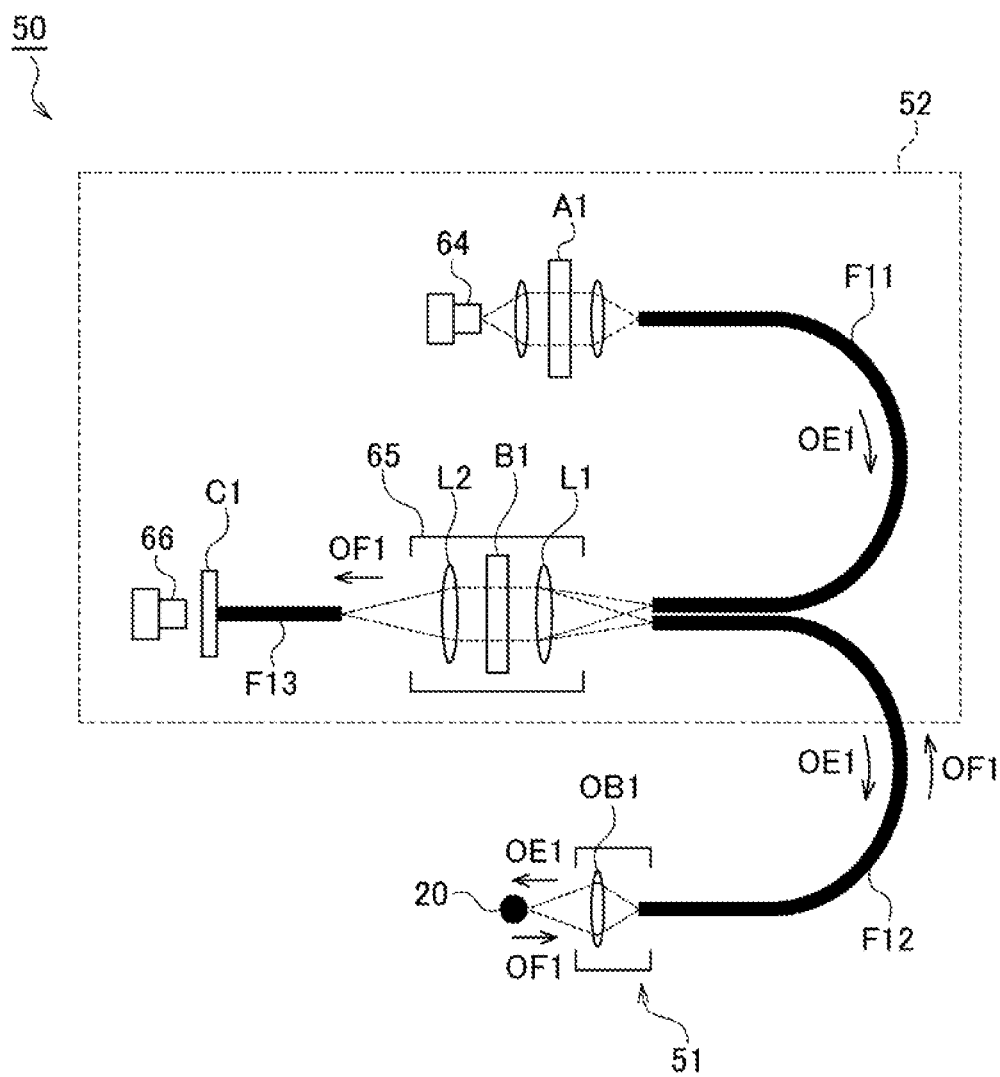
FIG. 3 is a diagram for explaining the configuration of a fluorescence detection device.

FIG. 3 is a diagram for explaining the configuration of a fluorescence detection device. The configuration of the first fluorescence detection device 50 is explained in FIG. 3. However, the second fluorescence detection device 54 also has the same configuration except that the center wavelength of the bandpass filter is different.

As shown in FIG. 3, the first fluorescence detection device 50 is provided with a first optical head 51, a first fluorescence detection excitation light source/detector module 52, and an optical fiber F12 connecting the first optical head 51 and the first fluorescence detection excitation light source/detector module 52. The first fluorescence detection excitation light source/detector module 52 includes a first excitation light source 64, a first wavelength multiplexer/demultiplexer 65, and a first fluorescence detector 66. These functional elements are connected by optical fibers, and excitation light and fluorescence propagate inside the optical fibers.

A bandpass filter A1 is arranged near the first excitation light source 64 such that excitation light emitted from the first excitation light source 64 is transmitted. The first wavelength multiplexer/demultiplexer 65 has a bandpass filter B1. A bandpass filter C1 is arranged near the first fluorescence detector 66 such that fluorescence incident on the first fluorescence detector 66 is transmitted. The wavelength characteristics of these bandpass filters are designed according to the wavelength characteristics related to excitation/fluorescence of a fluorescent dye such as FAM. Each of the bandpass filters has a spectroscopic function of transmitting light in a specific wavelength range with high efficiency (for example, transmittance of 75% or more) and reflecting light of other wavelengths with high efficiency (for example, reflectance of 75% or more, and desirably 85% or more).

In the present embodiment, the first fluorescence detection device 50 is formed to be able to detect fluorescence from a sample containing FAM as a fluorescent dye.

The first excitation light source 64 is not particularly limited as long as the first excitation light source 64 is a light source that can disperse light of a target wavelength later, and for example, LD, LED, white light source, or the like can be used. Excitation light emitted from the first excitation light source 64 is dispersed by the bandpass filter A1, and only light having a wavelength in a predetermined range with a center wavelength of about 470 nm (hereinafter, referred to as "excitation light OE1") propagates inside the optical fiber F11.

The excitation light OE1 enters the first wavelength multiplexer/demultiplexer 65, is collimated by the lens L1, and then reaches the bandpass filter B1. Since the bandpass filter B1 is designed to reflect the excitation light OE1, the excitation light OE1 is condensed again by the lens L1 and enters the optical fiber F12. The excitation light OE1 propagates inside the optical fiber F12 and reaches the first optical head 51. An objective lens OB1 is provided inside the first optical head 51, and the excitation light OE1 is applied to the sample 20 as excitation light at a predetermined working distance.

When the excitation light OE1 is applied to the sample 20, a fluorescent dye inside the sample 20 is excited, and fluorescence light OF1 is emitted from the sample 20. The fluorescence OF1 is condensed by the objective lens OB1 of the first optical head 51, enters the optical fiber F12, and propagates inside the optical fiber F12. The fluorescence OF1 enters the first wavelength multiplexer/demultiplexer 65, is collimated by the lens L1, and then reaches the bandpass filter B1.

In general, the wavelength of fluorescence generated by irradiation with excitation light is longer than the wavelength of excitation light. That is, given that the center wavelength of excitation light is $\lambda e$ and that the center wavelength of fluorescence is λf, λe<λf is satisfied. Therefore, in order to guide only the fluorescence OF1 to the first fluorescence detector 66, a bandpass filter having a spectral characteristic of reflecting light of a wavelength of λe and transmitting light of a wavelength of λf is used as the bandpass filter B1. The bandpass filter B1 is designed to transmit, in the fluorescence OF1, light having a wavelength in a range that does not overlap with the wavelength of the excitation light OE1. The fluorescence OF1 that has passed through the bandpass filter B1 is condensed by the lens L2 and enters the optical fiber F13. Further, since the bandpass filter B1 has a function of reflecting excitation light and transmitting fluorescence, an edge filter capable of reflecting light in a wavelength range including λe and transmitting light in a wavelength range including λf in accordance with the respective center wavelengths thereof can be used instead of a band pass filter.

The fluorescence OF1 propagating inside the optical fiber F13 reaches the first fluorescence detector 66. In order to precisely adjust the wavelength range, the fluorescence OF1 may pass through the bandpass filter C1 before entering the first fluorescence detector 66. Only light having a wavelength within a predetermined range with a center wavelength of about 530 nm that has passed through the bandpass filters B1 and C1 enters the first fluorescence detector 66. The first fluorescence detector 66 is a photoelectric conversion element such as PD, APD, or photomultiplier. A signal converted into an electrical signal by the first fluorescence detector 66 is subjected to a signal process described later.

In the first fluorescence detection device 50 shown in FIG. 3, each element may include a lens for efficiently transmitting or coupling light or for improving the utilization efficiency of a bandpass filter. As the lens, a gradient index lens, a ball lens, an aspherical lens, or the like can be used. Further, in the first fluorescence detection device 50 shown in FIG. 3, single mode fibers or multimode fibers may be used for the optical fibers F11, F12, and F13.

The first fluorescence detection device 50 formed as described above irradiates the sample with light having a center wavelength of 470 nm and a wavelength range of about 450 to 490 nm as first excitation light OE1, and detects first fluorescence OF1 having a center wavelength of 530 nm and a wavelength range of about 510 to 550 nm emitted by the sample. A person skilled in the art should appreciate that the characteristics relating to wavelengths are determined by the combination of the transmission characteristics or the reflection characteristics of each bandpass filter as described above and that those characteristics can be changed or customized.

On the other hand, in the present embodiment, the second fluorescence detection device 54 is formed to be able to detect fluorescence from a sample containing ROX as a fluorescent dye. The second fluorescence detection device 54 irradiates the sample with light having a center wavelength of 530 nm and a wavelength range of about 510 to 550 nm as second excitation light OE2, and detects second fluorescence OF2 having a center wavelength of 610 nm and a wavelength range of about 580 to 640 nm.

Figure 4:
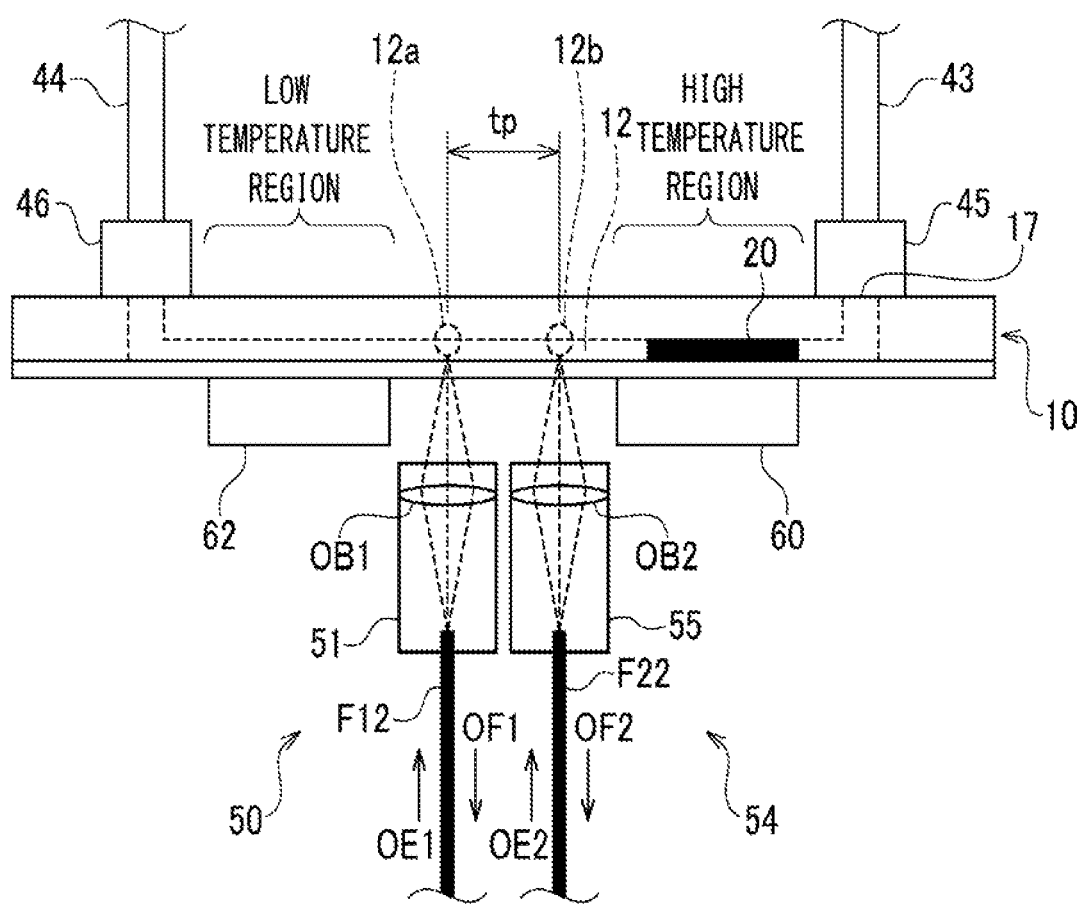
FIG. 4 is a diagram showing a state where a first optical head of a first fluorescence detection device and a second optical head of a second fluorescence detection device are arranged.

FIG. 4 shows a state where the first optical head 51 of the first fluorescence detection device 50 and the second optical head 55 of the second fluorescence detection device 54 are arranged. The optical head 51 is arranged so as to be able to detect fluorescence from the sample 20 passing through the first fluorescence detection region 12a of the channel 12. The second optical head 55 is arranged so as to be able to detect fluorescence from the sample 20 passing through the second fluorescence detection region 12b of the channel 12.

Further, either one of the first optical head 51 of the first fluorescence detection device 50 and the second optical head 55 of the second fluorescence detection device 54 may bear ranged near the middle of the connection region or the midway between the low temperature region and the high temperature region.

As shown in FIG. 4, the first optical head 51 allows the first excitation light OE1 propagating inside the optical fiber F12 to be condensed by the objective lens OB1, irradiates the sample 20 passing through the first fluorescence detection region 12a with the resulting first excitation light OE1, and allows the first fluorescence OF1 generated from the sample 20 to be condensed by the objective lens OB1 and enter the optical fiber F12. In the same manner, the second optical head 55 allows the second excitation light OE2 propagating inside the optical fiber F22 to be condensed by the objective lens OB2, irradiates the sample 20 passing through the second fluorescence detection region 12b with the resulting second excitation light OE2, and allows the second fluorescence OF2 generated from the sample 20 to be condensed by the objective lens OB2 and enter the optical fiber F22.

The respective diameters of the first optical head 51 and the second optical head 55 are, for example, 1 to 4 mm, and the first optical head 51 and the second optical head 55 are arranged at an arbitrary interval larger than that. The distance between the center of the first fluorescence detection region 12a irradiated with the first excitation light OE1 from the first optical head 51 and the center of the second fluorescence detection region 12b irradiated with the second excitation light OE2 from the second optical head 55 is referred to as "inter-fluorescent point distance tp".

As the objective lenses OB1 and OB2, lenses or a lens group having positive power, for example, Selfoc (registered trademark) microlenses, which are gradient index lenses, can be used. As the objective lenses OB1 and OB2, for example, those having a diameter of 1.8 mm, a numerical aperture (NA) of 0.23, and a WD of 1 mm to 3 mm can be used.

In the present embodiment, the first excitation light source of the first fluorescence detection device 50 is modulated by the first modulation signal and emits flashing light. In the same manner, the second excitation light source of the second fluorescence detection device 54 is modulated by the second modulation signal and emits flashing light.

Figure 5:
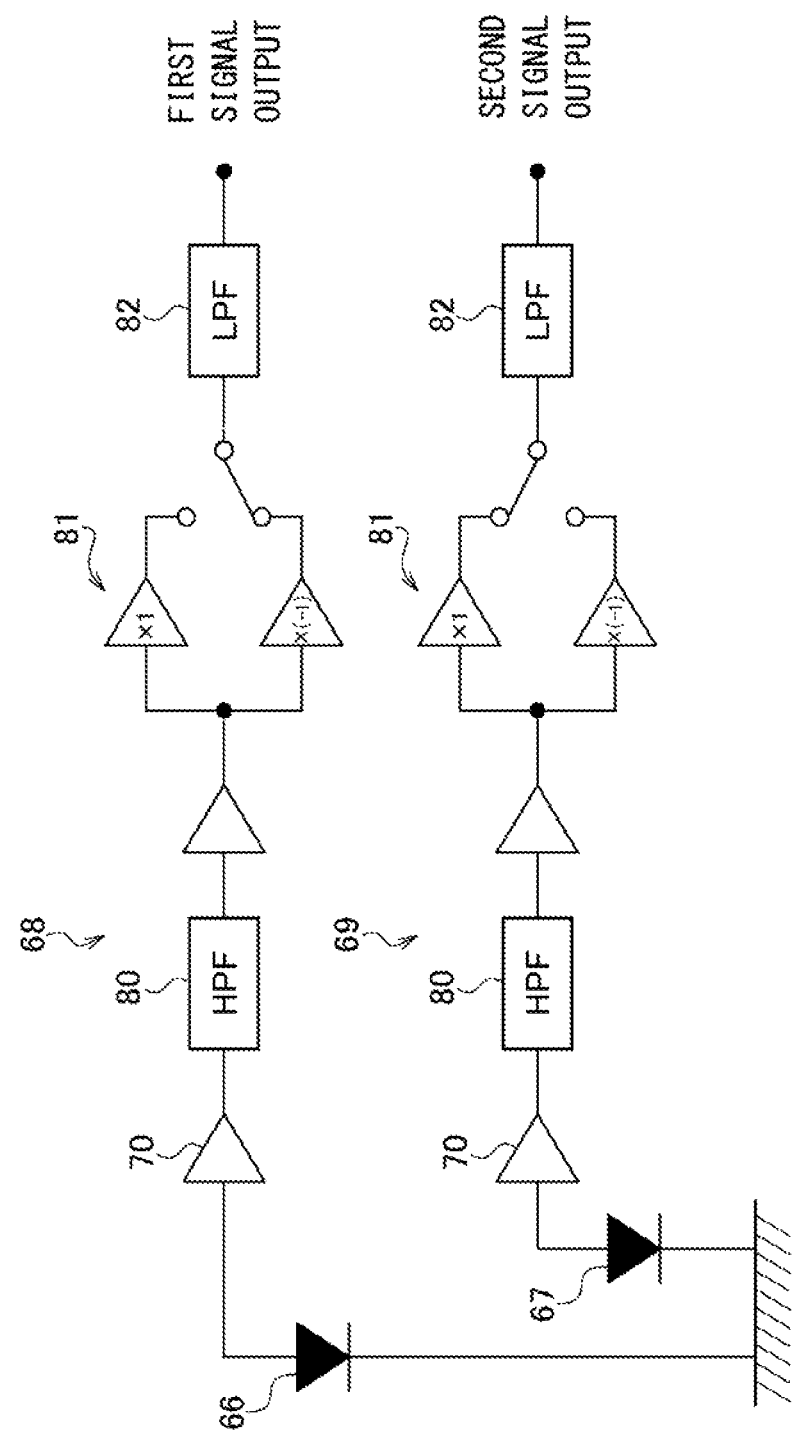
FIG. 5 is a diagram for explaining the circuit configuration of a lock-in amplifier that processes a fluorescence signal from a fluorescence detector.

FIG. 5 is a diagram for explaining the circuit configuration of a lock-in amplifier that processes a fluorescence signal from a fluorescence detector.

In the present embodiment, the first fluorescence signal from the first fluorescence detector 66 of the first fluorescence detection device 50 is processed by a first lock-in amplifier 68. The first lock-in amplifier 68 includes an IV amplifier 70, a high pass filter 80, an inverting/non-inverting amplifier 81, and a low pass filter 82. The first fluorescence signal output from the first fluorescence detector 66 is appropriately amplified by the IV amplifier 70, and then the DC component is removed by the high pass filter (HPF) 80. This signal is further synchronously detected by the inverting/non-inverting amplifier 81 with the first modulation signal and converted into a direct current. The low pass filter (LPF) 82 removes noise from the signal converted into a direct current, and a first signal output according to the first fluorescence detection device 50 can be finally obtained.

The second fluorescence signal from the second fluorescence detector 67 of the second fluorescence detection device 54 is processed by a second lock-in amplifier 69. The configuration of the second lock-in amplifier 69 is the same as that of the first lock-in amplifier 68. By processing the second fluorescence signal from the second fluorescence detector 67 using the second lock-in amplifier 69, a second signal output according to the second fluorescence detection device 54 can be finally obtained.

In the present embodiment, the first optical head 51 and the second optical head 55 are arranged side by side in order to detect the sample 20 passing through a single channel 12. As described above, the first fluorescence detection device 50 emits the first excitation light OE1 having a center wavelength of 470 nm and a wavelength range of about 450 to 490 nm, and detects first fluorescence OF1 having a center wavelength of 530 nm and a wavelength range of about 510 to 550 nm. The second fluorescence detection device 54 emits the second excitation light OE2 having a center wavelength of 530 nm and a wavelength range of about 510 to 550 nm, and detects second excitation light OE2 having a center wavelength of 610 nm and a wavelength range of about 580 to 640 nm. Therefore, the wavelength range of the second excitation light OE2 (about 510 to 550 nm) and the wavelength range of the first fluorescence OF1 (about 510 to 550 nm) overlap. In this case, when a part of the second excitation light OE2 emitted from the second optical head 55 is detected by the first optical head 51, the second excitation light OE2 may not be removed by the post-stage bandpass filters B1 and C1 of the first optical head 51 and may reach the first fluorescence detector 66. The second excitation light OE2 is noise in the first fluorescence detector 66, and the first fluorescence OF1, which should be essentially detected, may not be able to be detected.

When the first optical head 51 and the second optical head 55 are arranged so as to be sufficiently separated from each other, such a problem does not arise. However, the size of the reaction processing apparatus 30 becomes large in this case. In order to solve such a contradictory problem, the present inventors diligently studied and investigated what kind of influence the fluorescence detection would have when the two optical heads are arranged side by side.

The present inventors actually examined what kind of influence was caused on the detection of fluorescence from a sample by the phase difference between a first modulation signal (first excitation light source modulation signal) according to the first fluorescence detection device 50 and a second modulation signal (second excitation light source modulation signal) according to the second fluorescence detection device 54, in other words, the phase difference between flashing of the first excitation light and flashing of the second excitation light. The experimental conditions are shown below.

(1) As shown in FIG. 4, the first optical head 51 and the second optical head 55 were arranged side by side such that fluorescence from the sample 20 in the channel 12 could be condensed. The inter-fluorescent point distance tp, which is the distance between the center of the first fluorescence detection region 12*a* and the center of the second fluorescence detection region 12*b*, was set to 4.5 mm. (2) A first modulation signal having a first modulation frequency (110 Hz) was generated by a pulse generator or the like, and first excitation light from the first excitation light source was modulated using the first modulation signal. In the same manner, a second modulation signal having a second modulation frequency (110 Hz) was generated, and second excitation light from the second excitation light source was modulated using the second modulation signal. The respective duty ratios of the first modulation signal and the second modulation signal were both 50%. (3) The phase difference $\Delta\varphi$ between the modulation by the first modulation signal and the modulation by the second modulation signal was changed, and a first signal output according to the first fluorescence detection device 50 was measured. In this exemplary embodiment, a thermal cycle was not applied since only the phase difference dependency was detected for a fluorescence signal.

Figure 6:
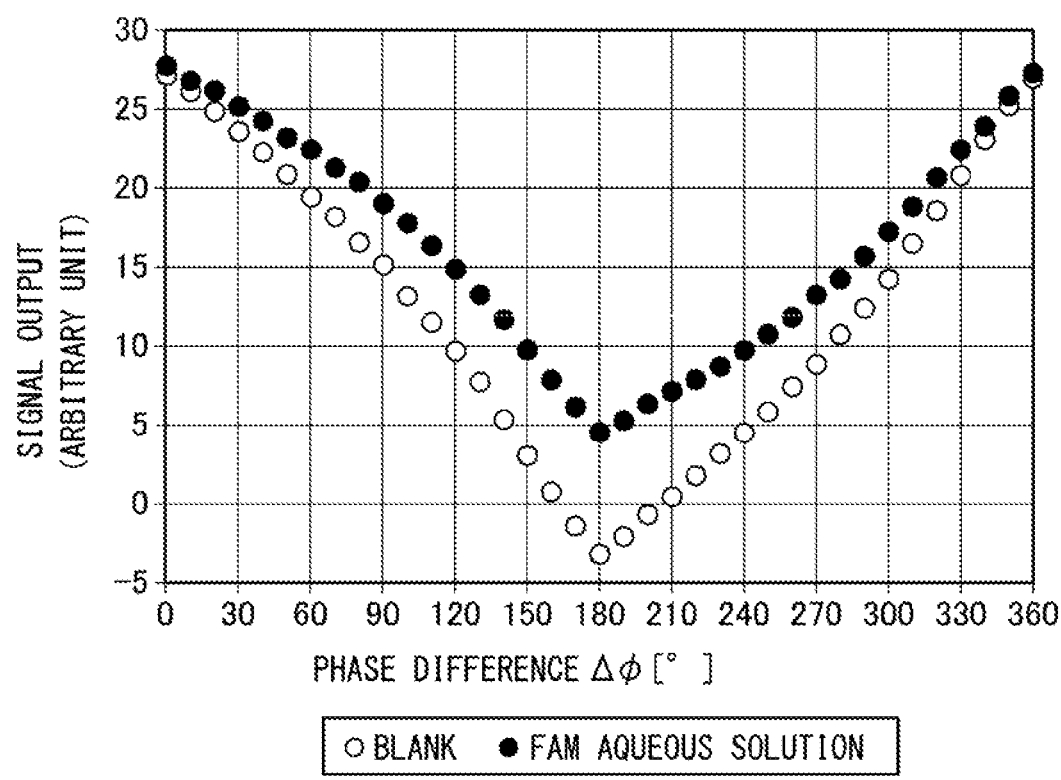
FIG. 6 is a diagram showing the measurement result of a first signal output according to the first fluorescence detection device when the phase difference between a first modulation signal and a second modulation signal is changed.

FIG. 6 shows the measurement result of a first signal output according to the first fluorescence detection device 50 when the phase difference between a first modulation signal and a second modulation signal is changed. In FIG. 6, black circle plot shows the measurement result when a FAM aqueous solution was used as a sample (indicated as "FAM aqueous solution"). A FAM aqueous solution (concentration of 30 nM) was put inside the channel 12 of the reaction processing vessel 10, and the phase difference $\Delta\varphi$ between the first modulation signal and the second modulation signal was changed from 0° to 360°, a first signal output according to the first fluorescence detection device 50 was measured. Also, in FIG. 6, a white circle plot shows the result (displayed as "blank") of measuring the first signal output in a state where nothing was put inside the channel 12 of the reaction processing vessel 10 (that is, a blank state).

As can be seen from FIG. 6, in both the "FAM aqueous solution" and the "blank" cases, the first signal output also changes according to the change in the phase difference $\Delta\varphi$, and the first signal output becomes maximum when the phase difference $\Delta\varphi$ is 0° and 360° (that is, there is no phase difference), and the first signal output becomes minimum when the phase difference $\Delta\varphi$ is 180°.

The signal output based on a fluorescence signal emitted from the FAM aqueous solution as the sample is obtained by subtracting the value of the first signal output in the case of "blank" from the value of the first signal output in the case of "FAM aqueous solution" shown in FIG. 6. By this calculation, the signal output based on the net fluorescence signal from the FAM aqueous solution can be obtained. The relationship between this signal output and the phase difference $\Delta\varphi$ (°) is shown by a black square plot (displayed as FAM aqueous solution (excluding blank)) in FIG. 7.

Figure 7:
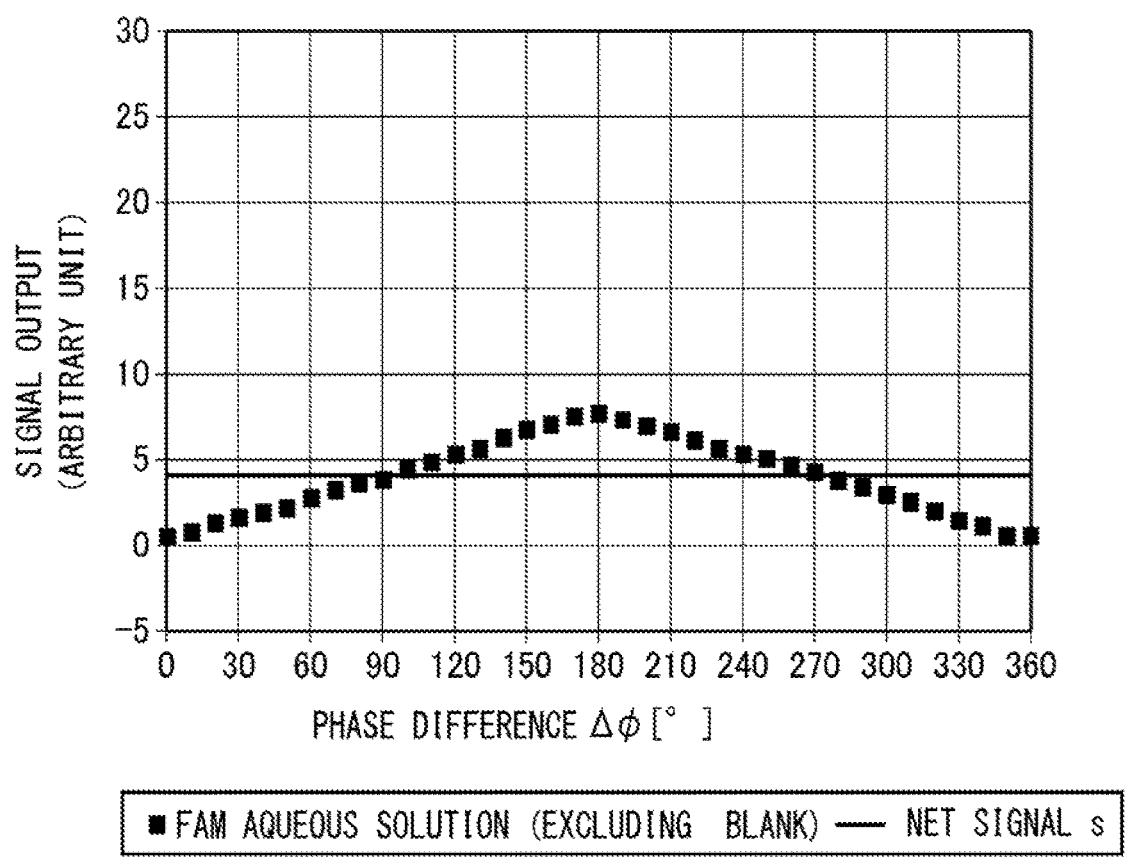
FIG. 7 is a diagram showing the relationship between a signal output and a phase difference based on a fluorescence signal from a FAM aqueous solution.

Based on FIG. 7, it can be found that the signal intensity based on the net fluorescence signal from the FAM aqueous solution varies depending on the value of the phase difference $\Delta\varphi$ between the first modulation signal of the first excitation light source and the second modulation signal of the second excitation light source. This means that the second excitation light has an influence on the fluorescence detection of the first fluorescence detection device 50 and that the degree of the influence differs depending on the phase difference $\Delta\varphi$.

Then, after stopping the second excitation light source, the respective intensities of the first signal outputs for the "blank" and the "FAM aqueous solution" were measured, and the difference between the intensities was calculated so as to obtain the signal intensity based on the net fluorescence signal from the FAM aqueous solution. In this case, since the second excitation light source was stopped, there was no concept of the phase difference $\Delta\varphi$, and the first signal output was constant (4.0). This value is based on the fluorescence signal from the FAM aqueous solution excluding the blank and is not affected by other excitation light/fluorescence detection systems. This value is shown by a solid line in FIG. 7 (displayed as "net signal s").

Figure 8:
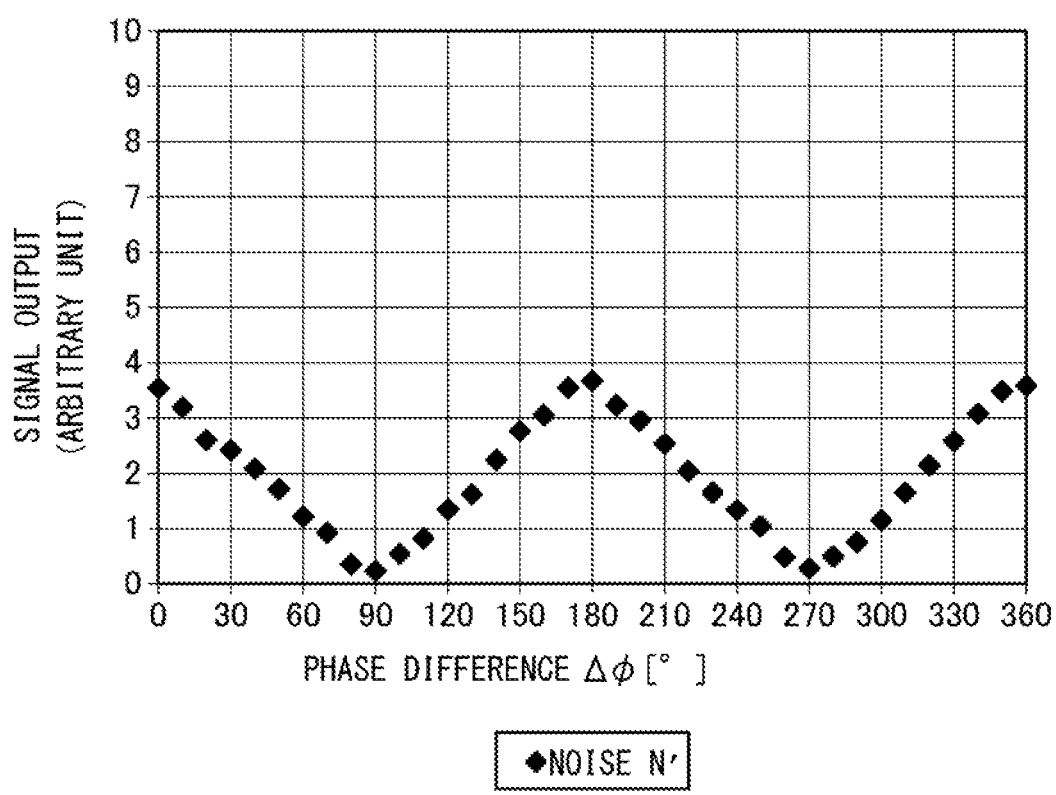
FIG. 8 is a diagram showing the relationship between noise and a phase difference when the respective duty ratios of the first modulation signal and the second modulation signal are both 50%.

The absolute value obtained by subtracting the value of the "net signal s" from the value of the "FAM aqueous solution (excluding blank)" corresponds to noise. The relationship between this noise (N') and the phase difference $\Delta\varphi$ p (°) is shown in FIG. 8. Based on FIG. 8, it can be found that, even in the presence of the second excitation light according to the second fluorescence detection device 54, the noise of the fluorescence signal obtained through the first lock-in amplifier 68 from the first fluorescence detector 66 according to the first fluorescence detection device 50 is minimum when the phase difference Δφ p is 90° and when the phase difference Δφ p is 270°.

Figure 9:
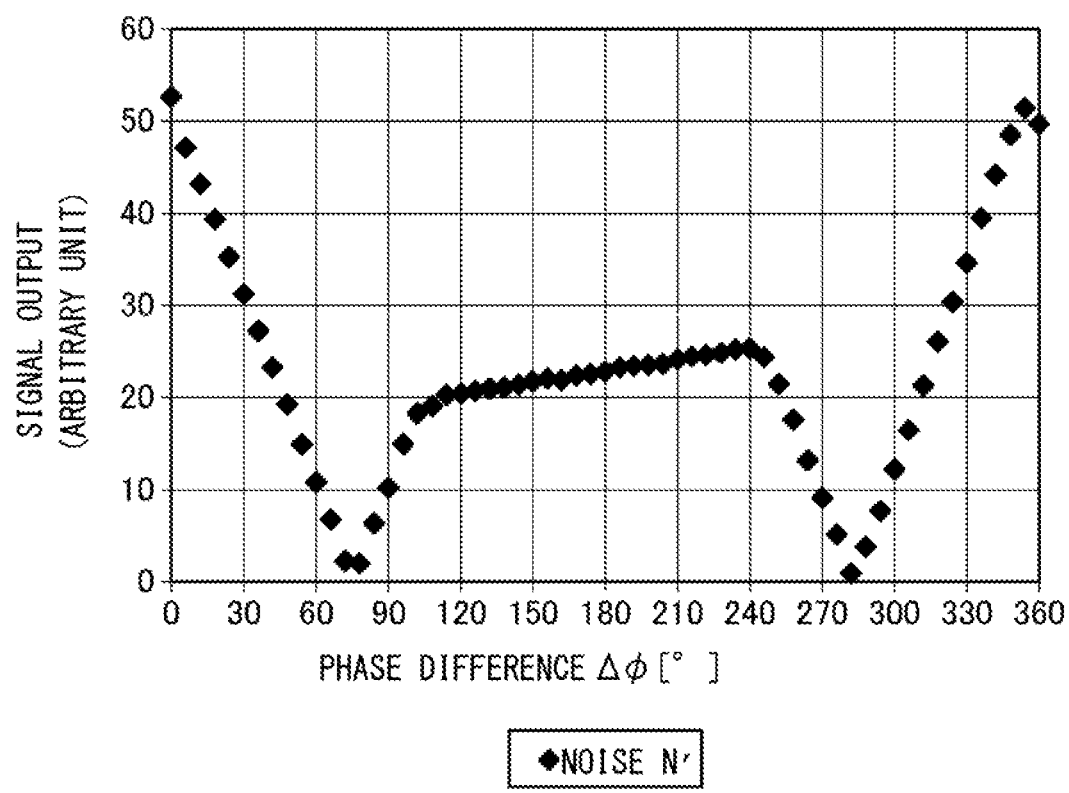
FIG. 9 is a diagram showing the relationship between noise and a phase difference when the respective duty ratios of the first modulation signal and the second modulation signal are both 30%.
Figure 10:
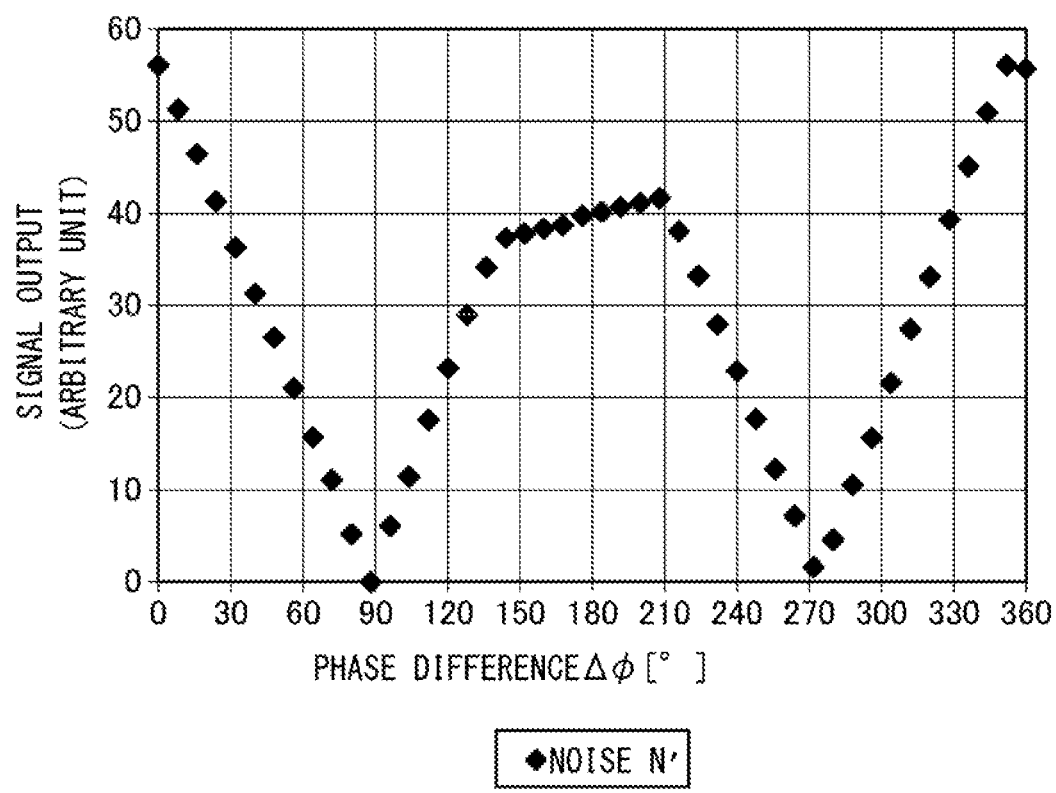
FIG. 10 is a diagram showing the relationship between noise and a phase difference when the respective duty ratios of the first modulation signal and the second modulation signal are both 40%.

FIG. 9 shows the relationship between the noise and the phase difference when the respective duty ratios of the first modulation signal and the second modulation signal are both 30%. FIG. 10 shows the relationship between the noise and the phase difference when the respective duty ratios of the first modulation signal and the second modulation signal are both 40%. In both FIGS. 9 and 10, the inter-fluorescent point distance tp was set to 4.5 mm. As shown in FIG. 9, phase differences Δφ p at which noise N' became minimum when the duty ratios were 30% were about 76° and about 284°. Further, as shown in FIG. 10, phase differences Δφ at which noise N' became minimum when the duty ratios were 40% were about 86° and about 274°.

From the above experimental results, it can be found that the optimum phase difference at which the noise N' becomes minimum changes depending on the difference in the respective duty ratios of the first modulation signal and the second modulation signal. This can be expressed using a mathematical expression, as can be derived from the following consideration.

FIGS. 11A, 11B, 11C and 11D are diagrams for explaining the operation of a lock-in amplifier when one of the two fluorescence detection devices is stopped. A case is now considered where, of the first fluorescence detection device 50 and the second fluorescence detection device 54, the second fluorescence detection device 54 is stopped (without causing the second excitation light source to emit flashing light) and a signal received by the first fluorescence detector 66 of the first fluorescence detection device 50 is processed by the first lock-in amplifier 68. Since the second fluorescence detection device 54 is stopped, the first fluorescence signal to be detected by the first fluorescence detection device 50 is not affected by the second excitation light of the second fluorescence detection device 54.

In the first lock-in amplifier 68 shown in FIG. 5, the output after the passing through the IV amplifier 70 is denoted as $V^1_1$, the output after the passing through the high pass filter 80 is denoted as $V^1_2$, the output after the passing through the inverting/non-inverting amplifier 81 is denoted as $V^1_{4a}$, and the output after the passing through the low pass filter 82 is denoted as $V^1_4$. In the explanation of lock-in amplifiers including the following explanation, output-related symbols that include V are arbitrary units according to voltage (Volt).

Figure 11A:
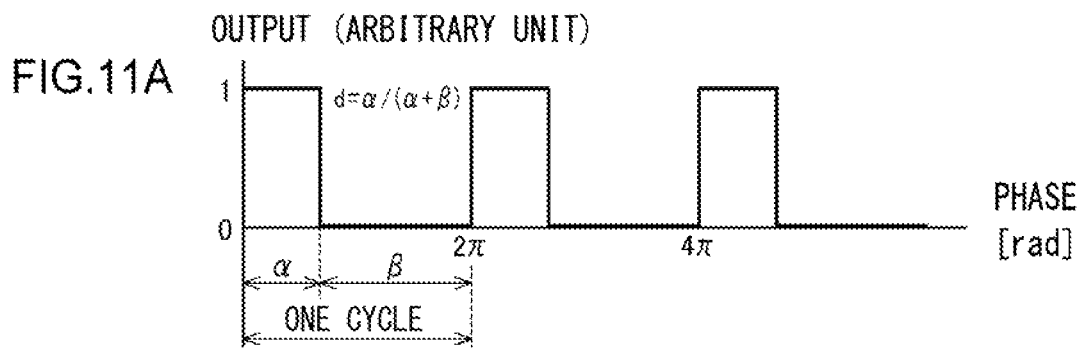
FIGS. 11A, 11B, 11C and 11D are diagrams for explaining the operation of the lock-in amplifier when one of the two fluorescence detection devices is stopped.
Figure 11B:
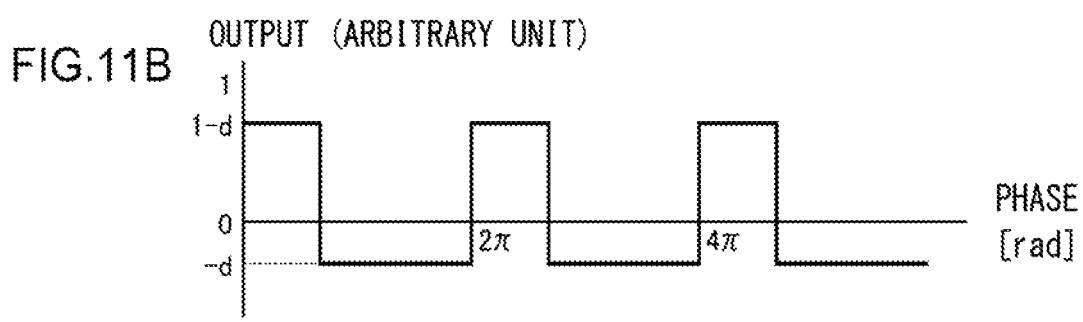
Figure 11C:
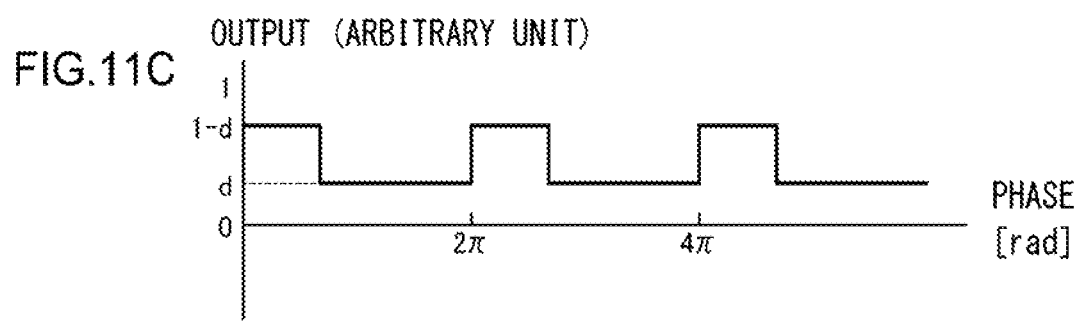
Figure 11D:
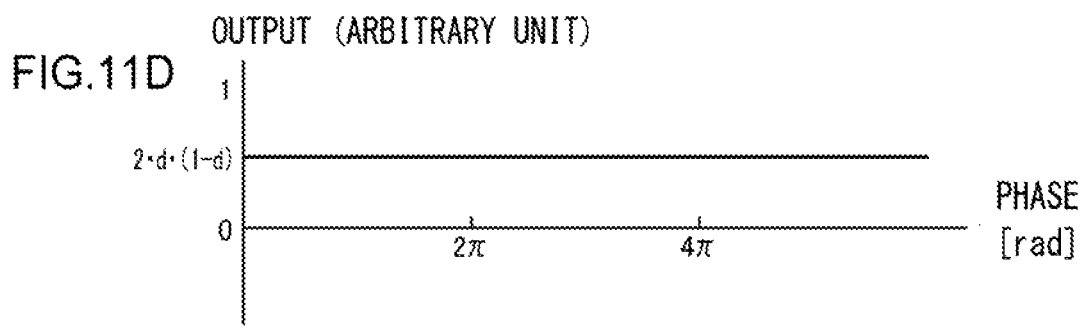

FIG. 11A shows the output $V^1_1$ after the passing through the IV amplifier. FIG. 11B shows the output $V^1_2$ after the passing through the high pass filter. FIG. 11C shows the output $V^1_{4a}$ after the passing through the inverting/non-inverting amplifier. FIG. 11D shows the output $V^1_4$ after the passing through the low pass filter. In FIGS. 11A, 11B, 11C and 11D, the horizontal axis represents the phase and the vertical axis represents the signal output. A so-called one cycle is 360° or 2π rad. The arbitrary phase φ (°) shows a relationship of φ*π/180 (rad). Inconsideration of ease of calculation, the phase is mainly represented by rad (radian).

For simplicity, a case is considered where the output $V^1_1$ after the passing through the IV amplifier is a rectangular signal as shown in FIG. 11A. $V^1_1$ is a rectangular signal having an output value of 1 in the region of a phase corresponding to a section α and an output value of 0 in the region of a phase corresponding to a section @ in a single cycle under a constant frequency. The duty ratio of this rectangular signal is expressed by d=α/(α+β) (0<d<1) or d=α/2π. Although the duty ratio of the output $V^1_1$ after the passing through the IV amplifier is described here, this duty ratio is the same as the duty ratio of the first excitation light emitted from the first excitation light source 64 that is turned on/off under the same frequency.

When a rectangular signal as shown in FIG. 11A passes through the high pass filter 80, the direct current component is cut. Thus, an output signal as shown in FIG. 11B is obtained. When the signal shown in FIG. 11B passes through the inverting/non-inverting amplifier 81, the sign of an output signal belonging to the above region of a phase corresponding to the section R is inverted, and an output signal as shown in FIG. 11C is therefore obtained. Further, when a signal as shown in FIG. 11C passes through the low pass filter 82, the alternating-current component is cut. Thus, an output signal as shown in FIG. 11D is obtained. The output value $V^1_4$ after the passing through the low pass filter can be expressed by the following expression (1) using a duty ratio d.

$$V^1 4 = 2*d*(1-d) \tag{1}$$

FIGS. 12A, 12B, 12C, 12D, 12E and 12F are diagrams for explaining the operation of the lock-in amplifier when both of the two fluorescence detection devices are operated. A case is considered where the first fluorescence detection device 50 and the second fluorescence detection device 54 are operated and a signal received by the first fluorescence detector 66 of the first fluorescence detection device 50 is processed by the first lock-in amplifier 68. Since the second fluorescence detection device 54 is being operated, the first fluorescence signal to be detected by the first fluorescence detection device 50 is affected by the second excitation light of the second fluorescence detection device 54.

Figure 12A:
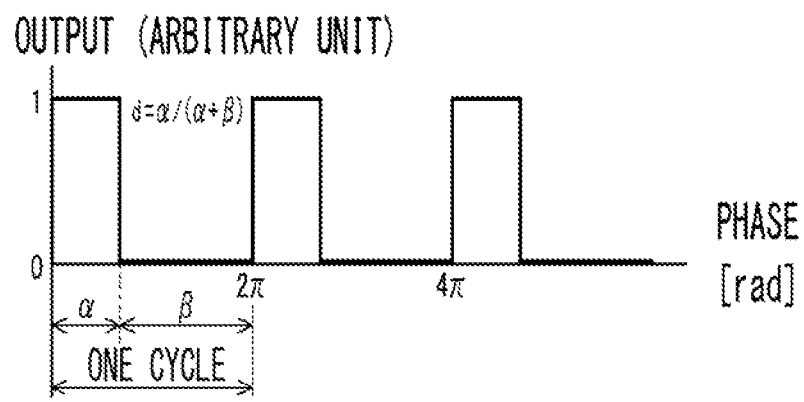
FIGS. 12A, 12B, 12C, 12D, 12E and 12F are diagrams for explaining the operation of the lock-in amplifier when both of the two fluorescence detection devices are operated.

FIG. 12A shows the output $V^1_1$ of the first lock-in amplifier 68 after the passing through the IV amplifier 70 when there is no influence of the second excitation light according to the second fluorescence detection device 54. As in the same way as in FIG. 11A, a rectangular signal is considered that has an output value of 1 in the region of a phase corresponding to the section α and an output value of 0 in the region of a phase corresponding to the section @ in a single cycle under a constant frequency and has the same duty ratio d as that in FIG. 11A.

Figure 12B:
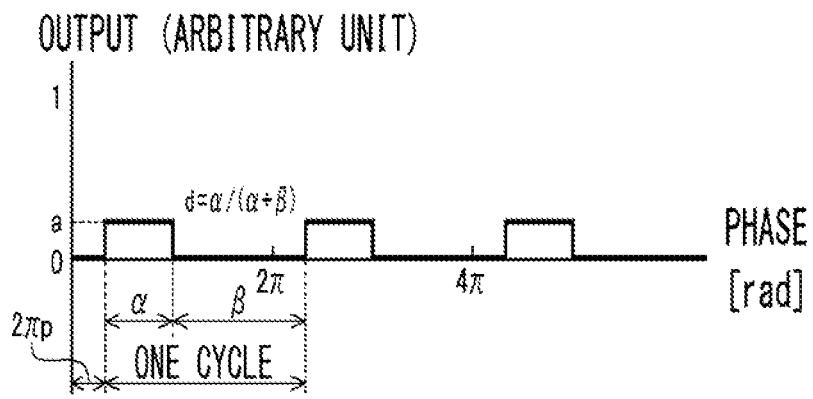

FIG. 12B shows a signal after light derived from the second excitation light according to the second fluorescence detection device 54 is received by the first fluorescence detector 66 and passes through the IV amplifier 70 of the first lock-in amplifier 68. This signal has an output value a (0<a<1) in the region of a phase corresponding to the section α and an output value of 0 in the region of a phase corresponding to the section β in a single cycle under the same frequency as that for $V^1_1$. This signal has the same duty ratio d as that for $V^1_1$. However, the signal derived from the second excitation light is delayed by 2πp (rad) (p is a parameter, 0<p<1) from the output signal $V^1_1$ shown in FIG. 12A. There is a relationship of Δφ=360*p between the phase difference expressed by Δφ p (°) and the phase difference pressed by 2πp (rad).

Figure 12C:
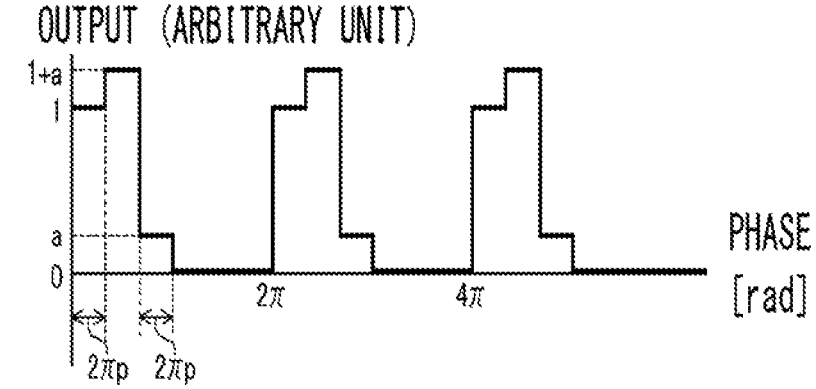

FIG. 12C shows the output $V^1_1$ actually output from the IV amplifier 70. This is the sum of the output signal shown in FIG. 12A and the output signal shown in FIG. 12B.

Figure 12D:
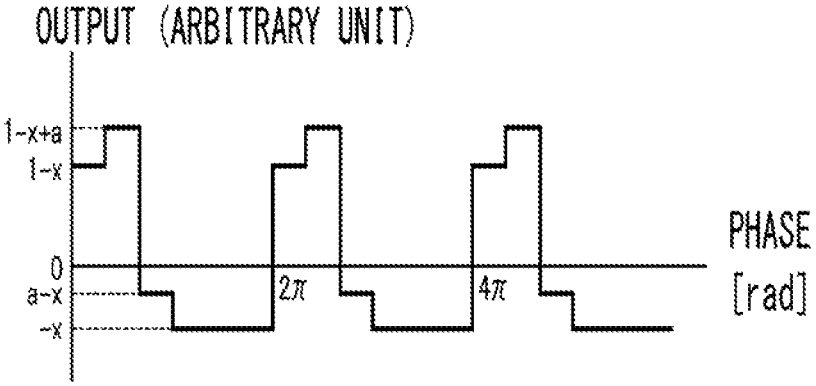

FIG. 12D shows the output $V^1_1$ after the passing through the high pass filter 80. The bias associated with the cutting of the direct current component due to the passing through the high pass filter 80 is assumed to be (−x). In the area of a region enclosed by the output and the phase, the area of a region on the positive side and the area of a region on the negative side are the same with 0 as the boundary. Therefore, the following expression (2) is satisfied.

From $(1-x)*p+(1+a-x)*(d-p)+(a-x)*p+(-x)*\{1-(d+p)\}=0$, $$x=(1+a)*d \tag{2}$$

Figure 12E:
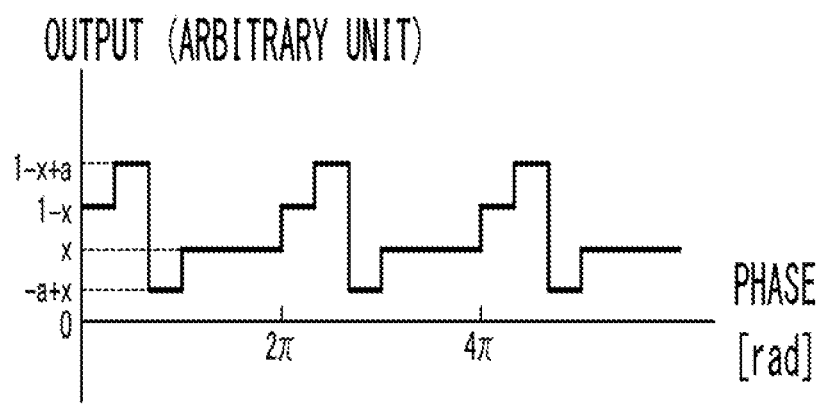
Figure 12F:
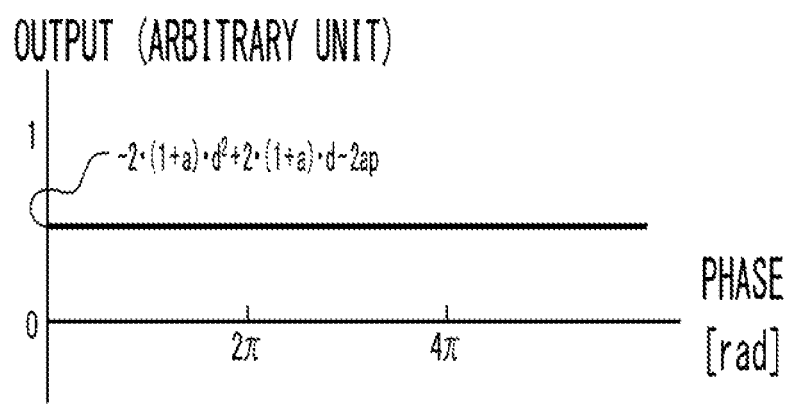

FIG. 12E shows the output $V^1_{4a}$ after the passing through the inverting/non-inverting amplifier 81. FIG. 12F shows the output $V^1_4$ after the passing through the low pass filter 82. When the signal shown in FIG. 12D passes through the inverting/non-inverting amplifier 81, the sign of an output signal belonging to the region of a phase corresponding to the section β according to the first fluorescence detection device is inverted, and an output signal as shown in FIG. 12E is therefore obtained. Further, when a signal as shown in FIG. 12E passes through the low pass filter 82, the alternating-current component is cut. Thus, an output signal as shown in FIG. 12F is obtained.

When the output (that is, the first signal output) $V^1_4$ after the passing through the low pass filter 82 is expressed in consideration of the relationship in the expression (2), the output is expressed in the following expression (3).

$$V^1_4=-2*(1+a)*d^2+2*(1+a)*d-2*a*p \tag{3}$$

From the above consideration, in the first signal output, the amount of output (the absolute value thereof) obtained by subtracting the expression (1) from the expression (3) is superimposed on the first signal output as noise. Thus, the value of a noise component $V^1_N$ is expressed by the following expression (4).

$$V^1_N=|-2*a*(d^2-d+p)| \tag{4}$$

In the expression (4), when $d^2-d+p=0$ is satisfied, $V^1_N$ becomes the minimum (0), and the value $p_m$ of the parameter p at this time is expressed by the following expression (5).

$$p_m=d-d^2 \tag{5}$$

From this expression (5), the $p_m$ values when the duty ratio is 0.5 (50%), 0.4 (40%), and 0.3 (30%) can be calculated to be 0.25, 0.24, and 0.21, respectively. Further, the optimum phase differences that minimize the noise component $V^1_N$ corresponding to these $p_m$ can be obtained to be 0.5π rad, 0.48π rad, and 0.42π rad. Also, in the notation in degrees (°), $\Delta\varphi_m=90.0°$, $\Delta\varphi_m>, =86.4°$, and $\Delta\varphi_m>=75.6°$ can be obtained. These are almost the same as the above experimental results, and the validity of the experimental results is thus confirmed. Further, in comparison with the above experimental results, it can be understood that the noise component $V^1_N$ is also minimum when the phase difference is $2\pi(1-p_m)$ (rad) and $\Delta\varphi_m=360(1-p_m)$ (°).

As described above, in the reaction processing apparatus 30 according to the present embodiment, by setting the phase difference between flashing of the first excitation light emitted from the first optical head 51 and flashing of the second excitation light emitted from the second optical head 55 to be $2\pi p_m$ (rad) or $2\pi(1-p_m)$ (rad) using the $p_m$ set by the expression (5) (notation in units of degrees (°) is $360p_m$ (°) or $360(1-p_m)$ (°)), the interference between the first fluorescence detection device 50 and the second fluorescence detection device 54 can be suppressed.

Figure 13:
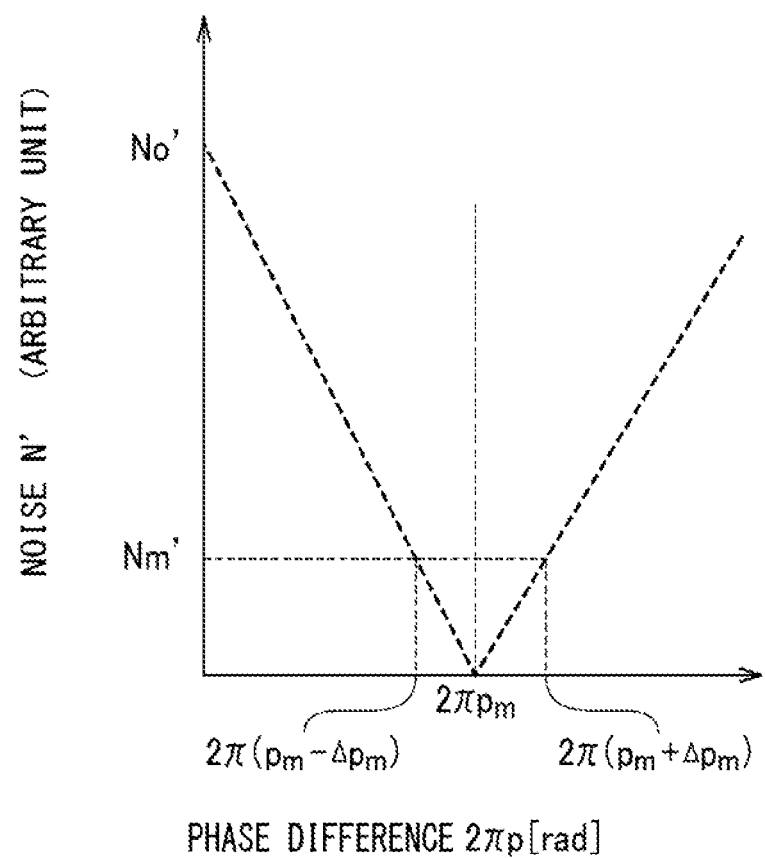
FIG. 13 is a diagram for explaining how to determine an allow able range for a phase difference corresponding to the minimum value of a signal output of noise.

FIG. 13 is a diagram for explaining how to determine an allowable range $\Delta p_m$ in $p_m$ corresponding to the minimum value of a signal output of noise N', where N' is the above-described noise notation $V^1_N$. FIG. 13 shows the relationship between the signal output of noise N' and the phase difference 2πp (rad).

Given that the noise N' when the phase difference 2πp is 0 rad is $N_0'$, that the allowable value of the noise N' is $N_m'$, and that the first signal output according to the first fluorescence detection device 50 when the second fluorescence detection device 54 is not operating is $V^1_0$, the allowable range $\Delta p_m$ in $p_m$ of the parameter p is expressed by the following expression (6) in consideration of the above expression (5).

$$\Delta p_m=(N_m')*(d-d^2)/(N_0')=(N_m'/V^1_0)*(d-d^2)/[(N_0')/V^1_0] \tag{6}$$

Since the ratio of $N_m'$ to the first signal output $V^1_0$ according to the first fluorescence detection device 50 when the second fluorescence detection device 54 is not operating is required to be 0.05 (5%), the allowable range $\Delta p_m$ is set to a value obtained by the following expression (7).

$$\Delta p_m=(d-d^2)/[20*(N_0')/V^1_0] \tag{7}$$

For example, when $V^1_0=4$ is satisfied and $N_0'$ of about 50 is required, and when the duty of the fluorescence detection device is 0.4, $p_m=0.24$ and the phase difference $2\pi p_m=0.48\pi$ rad (86.4°) are satisfied. From the expression (7), $\Delta p_m=0.00096$ is satisfied, and the allowable range of the phase difference is obtained to be 0.00192π rad (0.35°). Therefore, the appropriate range of the phase difference can be 0.48π±0.00192 (rad) (86.4±0.35 (°)), and further can be 1.52π±0.00192 (rad) (273.6±0.35 (°)).

Further, since the ratio of $N_m'$ to the first signal output $V^1_0$ is more desirably 0.03 (3%), the allowable range $\Delta p_m$ is set to a value obtained by the following expression (8). In the same way, given that $V^1_0=4$, $N_0'=50$, and d=0.4 are satisfied, $\Delta p_m=0.00058$ is satisfied, and the allowable range of the phase difference is obtained to be 0.00116π rad (0.21°). Therefore, the appropriate range of the phase difference can be 0.48π±0.00116 (rad) (86.4±0.21 (°)), and further can be 1.52π±0.00116 (rad) (273.6±0.21 (°)).

$$\Delta p_m=3*(d-d^2)/[100*(N_0')/V^1_0] \tag{8}$$

In addition, since the ratio of $N_m'$ to the first signal output $V^1_1$ is further desirably 0.01 (1%), the allowable range $\Delta p_m$ is set to a value obtained by the following expression (9). In the same way, given that $V^1_0=4$, $N_0'=50$, and d=0.4 are satisfied, $\Delta p_m=0.00019$ is satisfied, and the allowable range of the phase difference is obtained to be 0.00038π rad (0.07°). Therefore, the appropriate range of the phase difference can be 0.48π±0.00038 (rad) (86.4±0.07 (°)), and further can be 1.52π±0.00038π(rad) (273.6±0.07 (°)).

$$\Delta p_m=(d-d^2)/[100*(N_0')/V^1_0] \tag{9}$$

From the above examination results, the desirable range of the phase difference is expressed to be $2\pi(p_m-\Delta p_m)$ (rad) to $2\pi(p_m+\Delta p_m)$ (rad) or $2\pi[(1-p_m)-\Delta p_m]$ (rad) to $2\pi[(1-p_m)+\Delta p_m]$ (rad) in units of rad (radian), and can be generally expressed to be $360(p_m-\Delta p_m)$ (°) to $360(p_m+\Delta p_m)$ (°) or $360[(1-p_m)-\Delta p_m]$ (°) to $360[(1-p_m)+\Delta p_m]$ (°) in units of degrees (°). However, where d represents the duty ratio, $p_m=d-d^2$ is satisfied, and $\Delta p_m=(d-d^2)/[20*(N_0')/V^1_0]$, more desirably $\Delta p_m=3*(d-d^2)/[100*(N_0')/V^1_0]$, and more desirably $\Delta p_m=(d-d^2)/[100*(N_0')/V^1_0]$ is satisfied.

On the other hand, $\Delta p_m$ may be set to satisfy $\Delta p_m=0.01*p_m$ based on the relationship with $p_m$. In this way, $\Delta p_m$ may be uniquely set to 1% of $p_m$.

From the following experiment and consideration, it can be found that noise occurs in a signal obtained by processing, using a lock-in amplifier, a fluorescence signal detected by a fluorescence detector when the sample passes through a fluorescence detection region even when the phase difference between flashing of the first excitation light according to the first fluorescence detection device 50 and flashing of the second excitation light according to the second fluorescence detection device 54 is set such that the noise is minimized.

Figure 14:
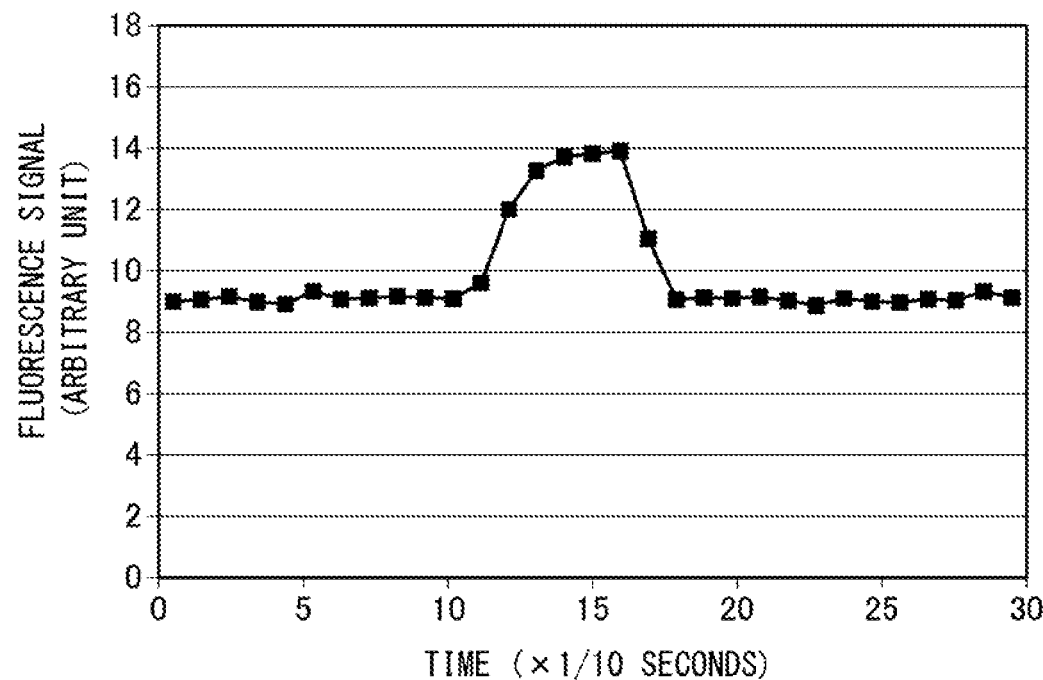
FIG. 14 is a diagram showing a relationship between a signal output from the first fluorescence detection device and time when the second fluorescence detection device is stopped.
Figure 15:
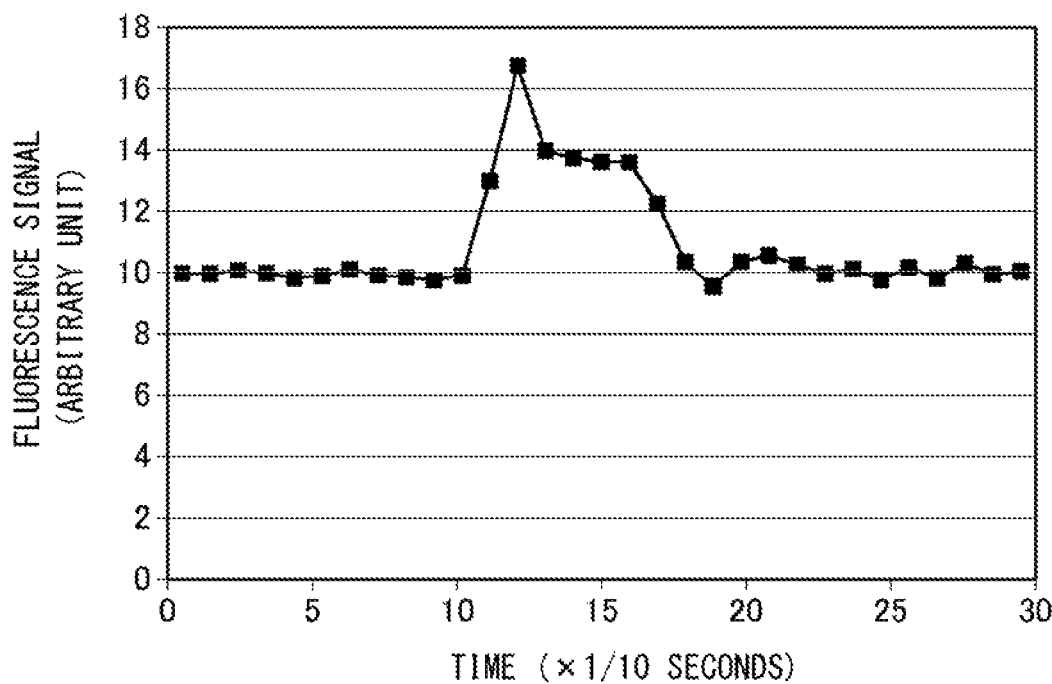
FIG. 15 is a diagram showing a relationship between a signal output from the first fluorescence detection device and time when the second fluorescence detection device is operated.

FIGS. 14 and 15 show a relationship between a signal output from the first fluorescence detection device 50 and time when a sample was moved inside the channel 12 and passed through a predetermined fluorescence detection region in the reaction processing apparatus 30 shown in FIG. 2. FIG. 14 shows a fluorescence signal output from the first fluorescence detection device 50 when the sample was moved inside the channel 12 while the second fluorescence detection device 54 was being stopped (that is, without flashing the second excitation light source). On the other hand, FIG. 15 shows a fluorescence signal output from the first fluorescence detection device 50 when the sample was moved inside the channel 12 while the second fluorescence detection device 54 was being operated (that is, while flashing the second excitation light source).

Both the first excitation light and the second excitation light were flashed at the same frequency (110 Hz) and the same duty ratio of 0.5 (50%), and the phase difference $\Delta\varphi$ between the first excitation light and the second excitation light was set to $0.5\pi$ rad (90.0°). Furthermore, each excitation light and fluorescence detector were independently arranged with respect to the channel such that the intensity of fluorescence from the sample in the channel 12 was maximized.

First, the behavior of a fluorescence signal at the time of the passing of the sample through the fluorescence detection region will be described with reference to FIG. 14. The intensity of a fluorescence signal shown in FIG. 14 shifts at a baseline over time and rises at a certain time ($11\times\frac{1}{10}$ seconds). It can be considered that the sample entered the first fluorescence detection region 12a at this time. Further, the fluorescence signal shifts to a substantially constant value (substantially 14 at arbitrary intensity) over time. It can be considered that this corresponds to the time during which the sample having a certain length were passing through the first fluorescence detection region 12a inside the channel 12. Then, at a certain time, the fluorescence signal falls to the baseline again. It can be considered that the sample came out of the first fluorescence detection region 12a at this time ($18\times\frac{1}{10}$ seconds). After that, the fluorescence signal shifts at the baseline.

The above explanation relates to the behavior of a fluorescence signal when a sample passes through the first fluorescence detection region 12a only once. In the case of PCR, a sample repeatedly moves in a reciprocating manner in a channel 12 and is repeatedly exposed to preset temperature regions of different levels (that is, thermal cycle), and specific DNA or the like contained in the sample is thereby amplified.

In the case of a sample containing a fluorescent dye, the intensity of fluorescence emitted from the sample increases as predetermined DNA or the like is amplified. Then, by monitoring the maximum value of a fluorescence signal obtained when the sample passes through a fluorescence detection region with respect to the increasing fluorescence intensity, real-time PCR accompanying amplification of the predetermined DNA can be realized.

Next, the behavior of a fluorescence signal at the time of the passing of the sample through the fluorescence detection region will be described with reference to FIG. 15. The behavior of the fluorescence signal shown in FIG. 15 is different from that of the fluorescence signal shown in FIG. 14. The fluorescence signal shown in FIG. 15 exhibits a large overshoot at a rising part and exhibits higher fluorescence intensity than substantially constant fluorescence intensity shown in the subsequent time. The occurrence of a large overshoot in a fluorescence signal as described above causes the fluorescence signal to vary, which makes it difficult to monitor the accurate intensity of the fluorescence signal, and real-time PCR may be thus hindered.

From the above, it is suggested that, in a plurality of combinations of excitation light/fluorescence, when the wavelength range corresponding to excitation light belonging to any combination and the wavelength range corresponding to fluorescence belonging to other combinations overlap, the detection of the fluorescence signal is affected even when the lock-in phase difference is optimized. The behavior of the fluorescence signal shown in FIG. 15 may exist even when the flashing phase difference between the excitation light of the first fluorescence detection device 50 and the excitation light of the second fluorescence detection device 54 is optimized.

Thus, the present inventors made earnest studies and experiments to reduce such an overshoot of a fluorescence signal and found that the cause for the overshoot lies in the inter-fluorescent point distance tp. More specifically, it was found that in a case where the NA of an optical system of an optical head for a sample was within a predetermined range, the noise value (Nv) became 0.2 or less, which was a suitable value, when the inter-fluorescent point distance tp was 4 mm or more.

Figure 16:
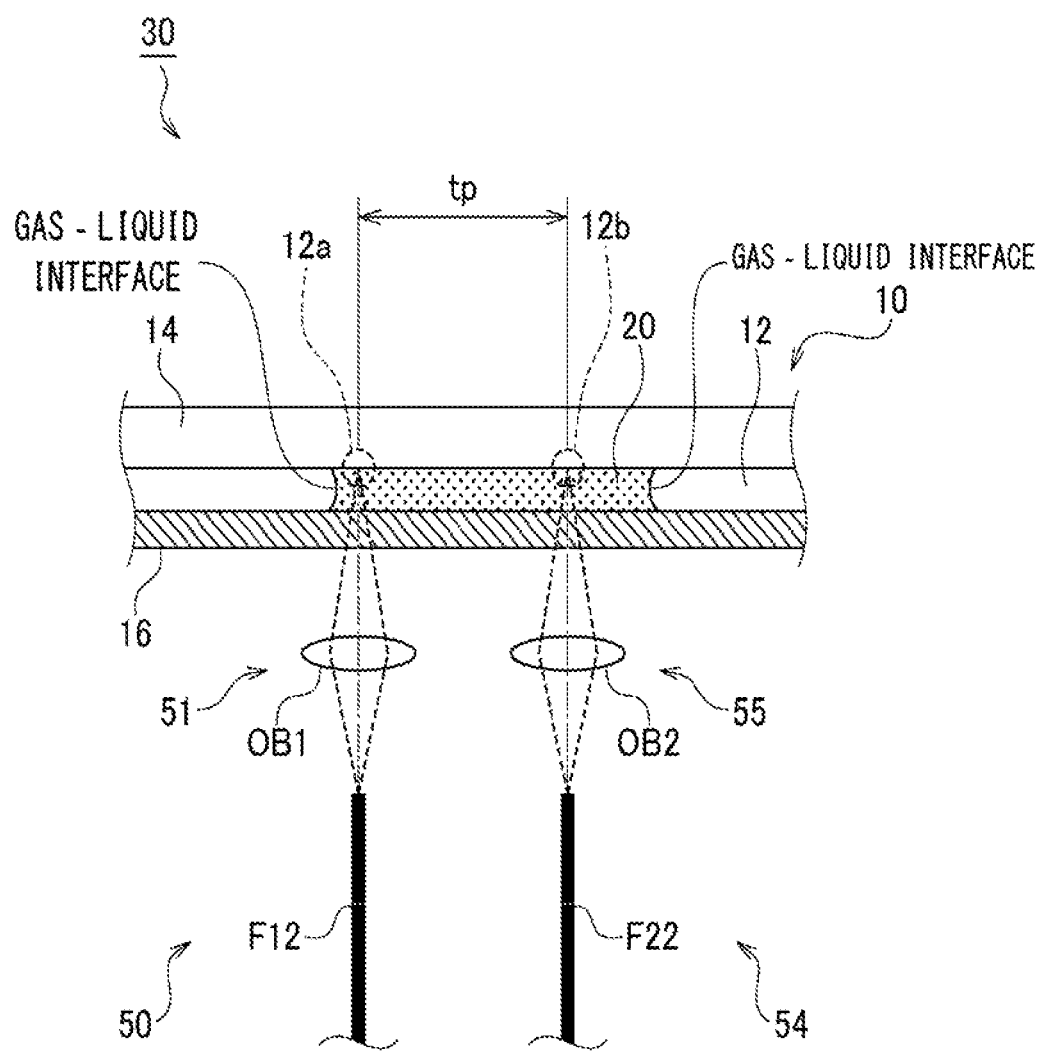
FIG. 16 is a diagram for explaining an exemplary embodiment of the present invention.

FIG. 16 is a diagram for explaining an exemplary embodiment of the present invention. In the same manner as in the above-described embodiment, the first optical head 51 and the second optical head 55 were arranged side by side such that the fluorescence from the sample 20 arranged in the channel 12 of the reaction processing vessel 10 could be detected. The first optical head 51 includes an objective lens OB1, and the second optical head 55 includes an objective lens OB2. A first fluorescence detection region 12a and a second fluorescence detection region 12b are set in the channel 12. The first optical head 51 irradiates the sample 20 located in the first fluorescence detection region 12a with excitation light and receives fluorescence. The second optical head 55 irradiates the sample 20 located in the second fluorescence detection region 12b with excitation light and receives fluorescence. The excitation light emitted from the first optical head 51 and the excitation light emitted from the second optical head 55 were flashed both at a frequency of 110 Hz and a duty ratio of 0.5. A lock-in process was performed on the fluorescence received by the first optical head 51 and the fluorescence received by the second optical head 55 by a lock-in amplifier (see FIG. 5) in the subsequent stage so that a fluorescence signal was output. Further, regarding the flashing of the excitation light emitted from the first optical head 51 and the excitation light emitted from the second optical head 55, the respective phases were adjusted such that the phase difference therebetween was $0.5\pi$ rad (90.0°). As shown in FIG. 16, the distance between the center of the first fluorescence detection region 12a and the center of the second fluorescence detection region 12b represents the inter-fluorescent point distance tp.

First Exemplary Embodiment

In the first exemplary embodiment, as the objective lens OB1 of the first optical head 51 and the objective lens OB2 of the second optical head 55, those having a numerical aperture (NA) of 0.23 were used. The first fluorescence detection device corresponds to FAM using a combination of blue excitation/green fluorescence, and the second fluorescence detection device corresponds to ROX using a combination of green excitation/red fluorescence.

Figure 17:
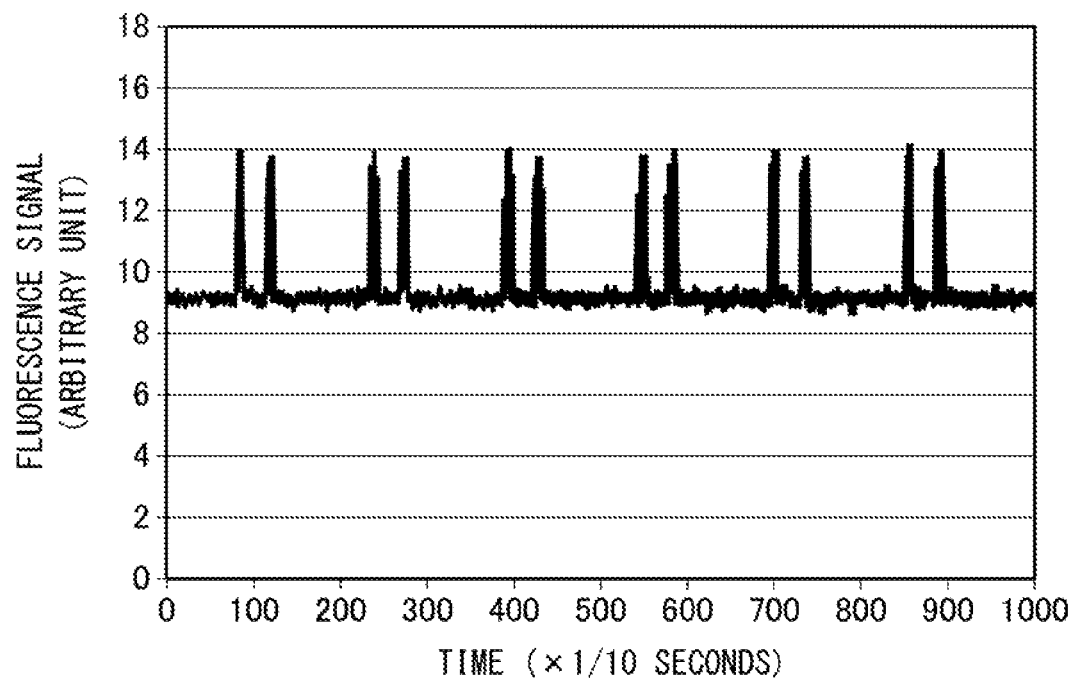
FIG. 17 is a diagram showing a fluorescence signal output from the first fluorescence detection device when an inter-fluorescent point distance is set to 4 mm in the first exemplary embodiment.

FIG. 17 shows a fluorescence signal output from the first fluorescence detection device 50 when the inter-fluorescent point distance tp is 4 mm in the first exemplary embodiment. A FAM aqueous solution was used for the sample. In FIG. 17, the horizontal axis represents time (×1/10 seconds), and the vertical axis represents fluorescence intensity (arbitrary unit). In a fluorescence signal shown in FIG. 17, two peaks appear as one set at approximately constant time intervals. The sample repeatedly moves in a reciprocating manner in the channel 12 (however, the moving speed was adjusted such that the transit time of the sample through the first fluorescence detection region 12*a* was about 0.5 seconds). Therefore, like the fluorescence signal of FIG. 17, the value of fluorescence intensity in an outward route and the value of fluorescence intensity in a return route appear as a set.

Second Exemplary Embodiment

In the second exemplary embodiment, as the objective lens OB1 of the first optical head 51 and the objective lens OB2 of the second optical head 55, those having a numerical aperture (NA) of 0.18 were used.

Third Exemplary Embodiment

In the third exemplary embodiment, as the objective lens OB1 of the first optical head 51 and the objective lens OB2 of the second optical head 55, those having a numerical aperture (NA) of 0.12 were used.

Fourth Exemplary Embodiment

In the fourth exemplary embodiment, as the objective lens OB1 of the first optical head 51 and the objective lens OB2 of the second optical head 55, those having a numerical aperture (NA) of 0.07 were used.

In the first through fourth exemplary embodiments, the inter-fluorescent point distance tp was changed to 2.5 mm, 2.75 mm, 3 mm, 3.5 mm, 4 mm, 4.5 mm, and 5 mm, and a fluorescence signal output from the first fluorescence detection device 50 was obtained for each inter-fluorescent point distance tp. In order to evaluate the variation in the fluorescence intensity obtained according to the reciprocating movement of the sample, the standard deviation of the maximum value of the fluorescence intensity at each peak obtained by 50 occurrences of the reciprocating movement of the sample was calculated as a noise value Nv and used as an index.

The following table summarizes the relationship between the inter-fluorescent point distance tp (mm) and the noise value Nv obtained for the first through fourth exemplary embodiments.

TABLE 1

| tp | NA | | | |
|---|---|---|---|---|
| [mm] | 0.23 | 0.18 | 0.12 | 0.07 |
| 2.5 | 1.715 | 1.417 | 1.162 | 0.281 |
| 2.75 | 1.204 | 1.131 | 0.813 | 0.162 |

TABLE 1-continued

| tp | NA | | | |
|---|---|---|---|---|
| [mm] | 0.23 | 0.18 | 0.12 | 0.07 |
| 3 | 0.794 | 0.772 | 0.705 | 0.161 |
| 3.5 | 0.458 | 0.454 | 0.235 | 0.136 |
| 4 | 0.155 | 0.175 | 0.162 | 0.119 |
| 4.5 | 0.171 | 0.139 | 0.172 | 0.131 |
| 5 | 0.177 | 0.177 | 0.128 | 0.123 |

Regarding the first exemplary embodiment where the numerical aperture (NA) was 0.23, when the inter-fluorescent point distance tp was 4 mm to 5 mm, the noise value Nv was less than 0.2, and a good result was obtained. Regarding the second exemplary embodiment where the numerical aperture (NA) was 0.18, when the inter-fluorescent point distance tp was 4 mm to 5 mm, the noise value Nv was less than 0.2, and a good result was obtained. Regarding the third exemplary embodiment where the numerical aperture (NA) was 0.12, when the inter-fluorescent point distance tp was 3.5 mm to 5 mm, the noise value Nv was less than 0.3, and a good result was obtained, and, when the inter-fluorescent point distance tp was 4 mm to 5 mm, the noise value Nv was less than 0.2, and a better result was obtained. Regarding the fourth exemplary embodiment where the numerical aperture (NA) was 0.07, when the inter-fluorescent point distance tp was 2.5 mm to 5 mm, the noise value Nv was less than 0.3, and a good result was obtained, and, when the inter-fluorescent point distance tp was 2.75 mm to 5 mm, the noise value Nv was less than 0.2, and a better result was obtained. Based on these experimental results, the present inventors found that the noise value Nv became 0.2 or less, which was a suitable value, when the inter-fluorescent point distance tp was 4 mm or more in a case where the numerical aperture NA of the optical head was in a range of 0.07 to 0.23.

In order to confirm the effect of the present exemplary embodiments, PCR was actually performed on the samples shown in the following table using the reaction processing apparatus 30 shown in FIG. 2, and a fluorescence signal was measured in real time. In an attempt to detect Vero toxin VT1, PCR samples were prepared using a KAPA3G Plant PCR kit, which is a PCR enzyme from KAPA Biosystems, in the manner shown in the table below.

TABLE 2

| Chemical agents, etc. | Final Concentration | Remarks |
|---|---|---|
| enzyme | 0.1 U/µL | KAPA 3G Plant (manufactured by KAPA Biosystems) |
| Primer F | 720 nM | 5'-GGA TAA TTT GTT TGC AGT TGA TGT-3' (SEQ ID NO: 1) (manufactured by NIHON GENE RESEARCH LABORATORIES Inc.) |
| Primer R | 720 nM | 5'-CAA ATC CTG TCA CAT ATA AAT TAT TTC GT-3' (SEQ ID NO: 2) (manufactured by NIHON GENE RESEARCH LABORATORIES Inc.) |
| Probe | 240 nM | 5'-CCG TAG ATT ATT AAA CCG CCC TTC CTC TGG A-3' (SEQ ID NO: 3) FAM is used for fluorescent dye and quencher is of a dark type (manufactured by NIHON GENE RESEARCH LABORATORIES Inc.) |
| Additional Mg | 1.25 mM | attached to KAPA 3G Plant |
| Buffer + Water | | In accordance with the KAPA 3G Plant manual, buffer and water are blended such that the concentration of the attached |

TABLE 2-continued

| Chemical agents, etc. | Final Concentration | Remarks |
|---|---|---|
| | | buffer is lowered down to ½ with respect to the total reagent. |

Figure 18:
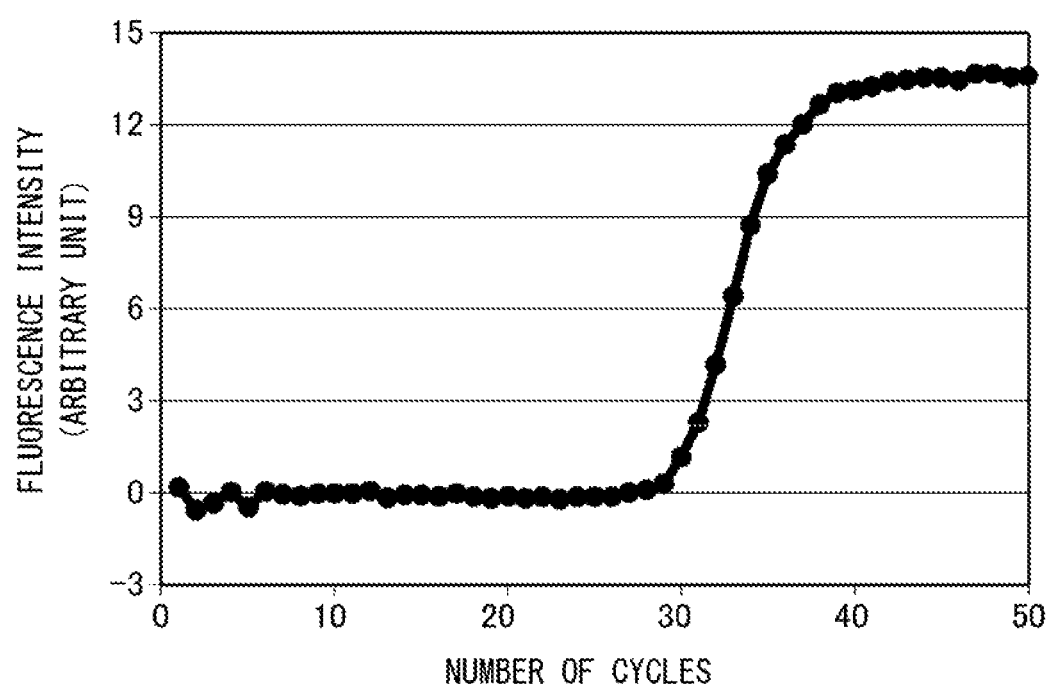
FIG. 18 is a diagram showing a PCR amplification result in the first exemplary embodiment.

PCR was performed for the first exemplary embodiment in which the numerical aperture NA of the objective lens was set to 0.23. FIG. 18 shows a PCR amplification result in the first exemplary embodiment. In FIG. 18, the horizontal axis represents the number of cycles, and the vertical axis represents the fluorescence intensity (arbitrary unit). Using the reaction processing apparatus 30 described above, the intensity of a fluorescence signal detected by the first fluorescence detection device 50 with respect to the number of cycles was measured. As a specimen in the sample was amplified, the fluorescence intensity increased. As shown in FIG. 18, the fluorescence intensity sharply rises from around 30 cycles. Such a sharp rise in fluorescence intensity indicates that the specimen in the sample is amplified, and it can be found that good PCR can be performed when the first exemplary embodiment is used.

Next, a comparative example is shown. In the comparative example, the inter-fluorescent point distance tp was set to 3 mm, and the other conditions were set to be the same as those in the first exemplary embodiment (see FIG. 17).

Figure 19:
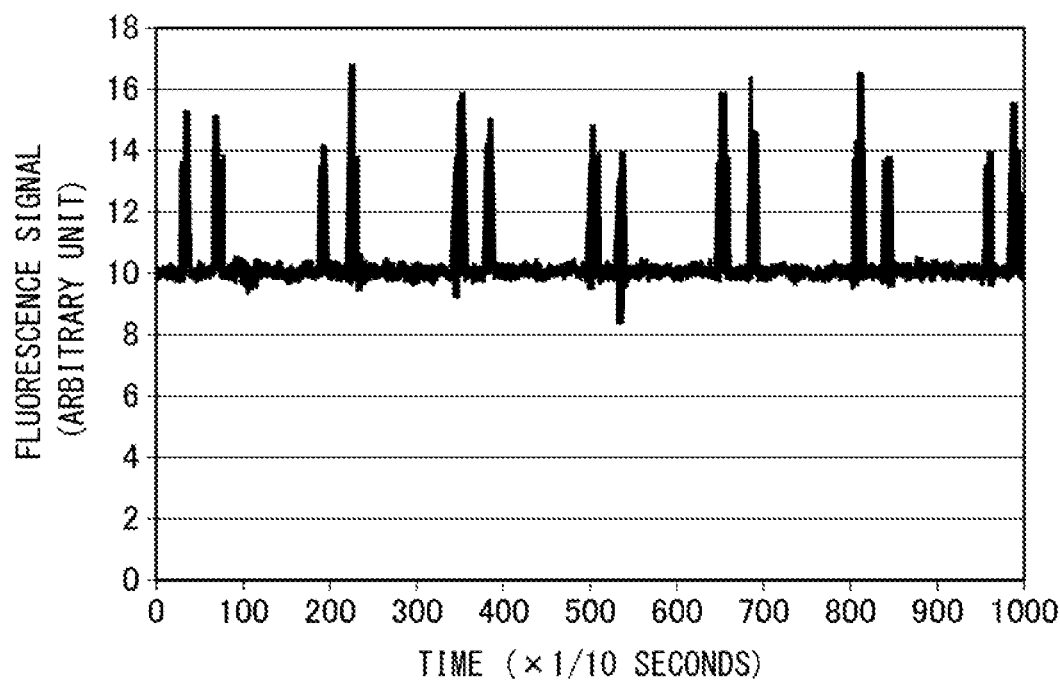
FIG. 19 is a diagram showing a fluorescence signal output from the first fluorescence detection device in a comparative example.

FIG. 19 shows a fluorescence signal output from the first fluorescence detection device 50 in the comparative example. Comparing the fluorescence signal shown in FIG. 19 with the case of the first exemplary embodiment shown in FIG. 17, it can be found that a very large overshoot occurred in the comparative example shown in FIG. 19.

Figure 20:
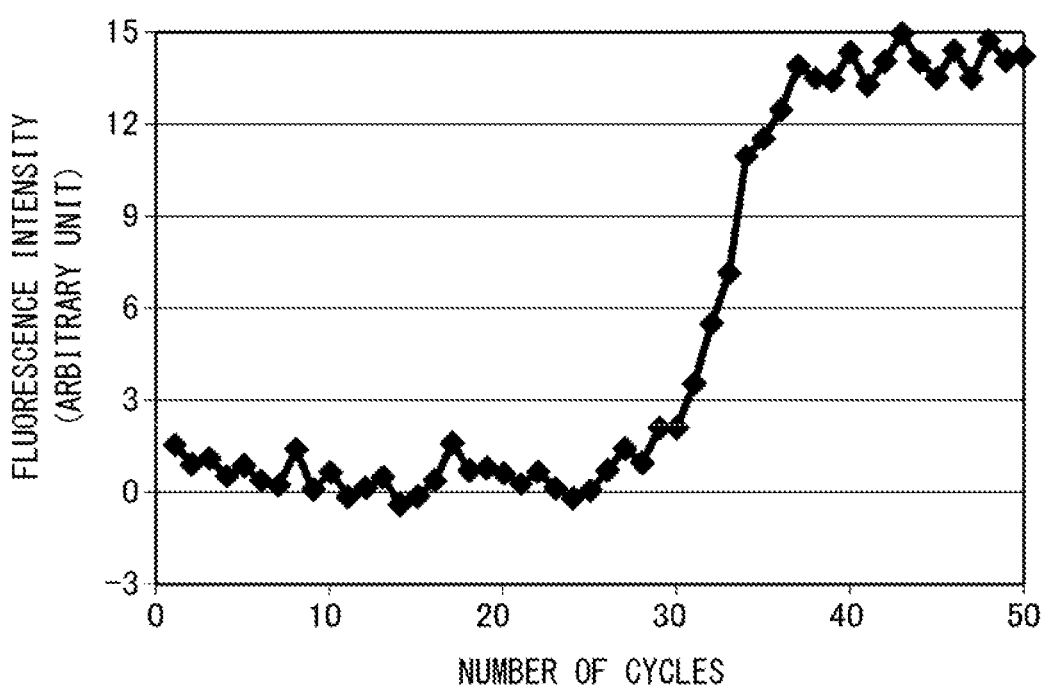
FIG. 20 is a diagram showing a PCR amplification result in the comparative example.

FIG. 20 shows the amplification result of PCR in the comparative example. When the amplification result of PCR shown in FIG. 20 is compared with the case of the first exemplary embodiment shown in FIG. 18, it can be found that the variation in fluorescence intensity is very large in the comparative example shown in FIG. 20. When the variation in the fluorescence intensity is large as described above, it is difficult to detect the rise of the fluorescence intensity, and thus the accuracy of the real-time PCR may decrease. From the comparison with this comparative example, the superiority of the present exemplary embodiments was demonstrated.

Figure 21:
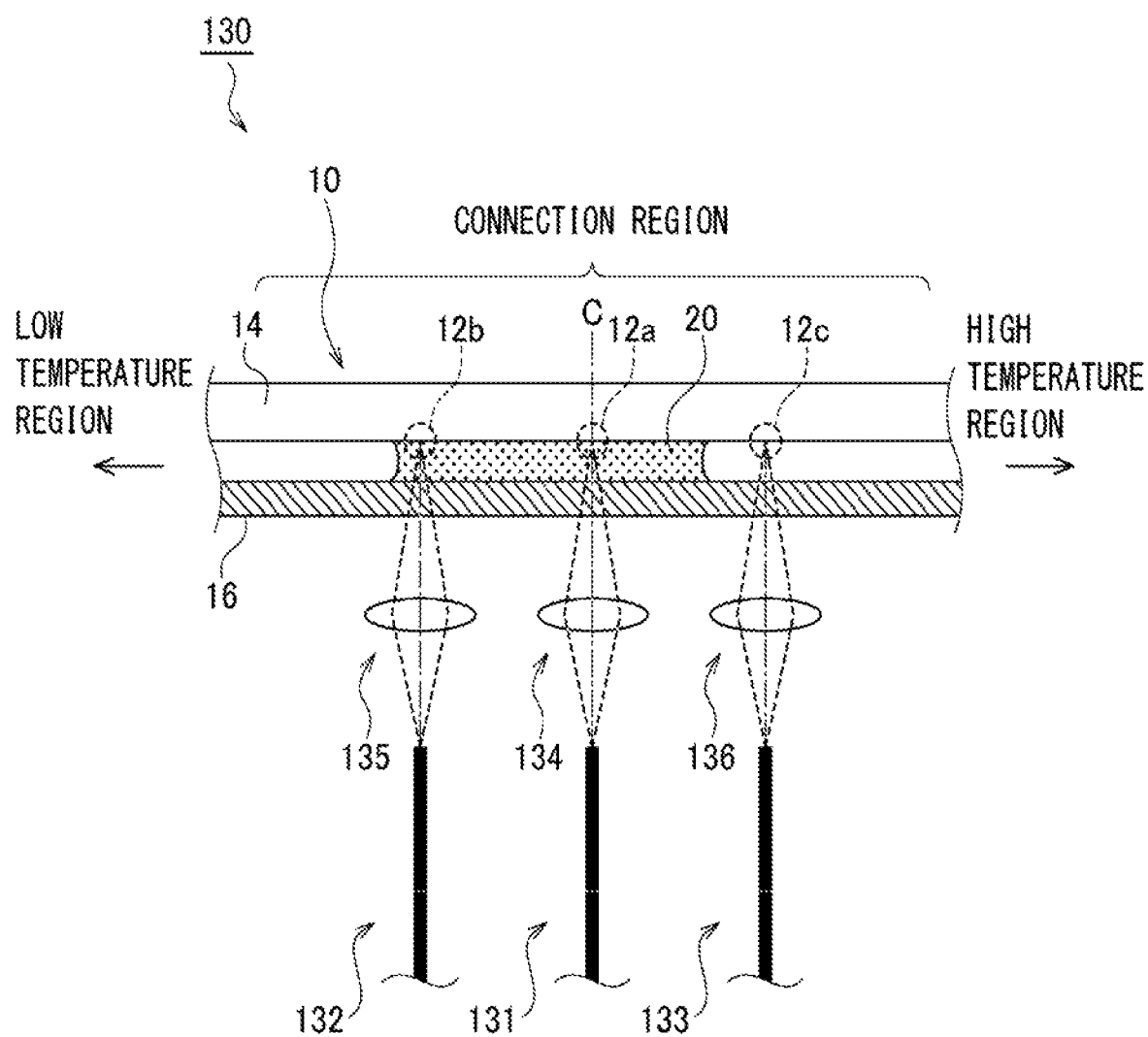
FIG. 21 is a diagram for explaining a reaction processing apparatus according to another embodiment of the present invention.

FIG. 21 is a diagram for explaining a reaction processing apparatus 130 according to another embodiment of the present invention. The reaction processing apparatus 130 shown in FIG. 21 is different from the reaction processing apparatus 30 shown in FIG. 2 in that the reaction processing apparatus 130 is provided with three fluorescence detection devices (a first fluorescence detection device 131, a second fluorescence detection device 132, and a third fluorescence detection device 133). In FIG. 21, only the three fluorescence detection devices and a part of there action processing vessel 10 are shown, and the illustration of the other structures is omitted.

The first fluorescence detection device 131 is formed to be able to detect fluorescence from a sample containing FAM as a fluorescent dye. The first fluorescence detection device 131 includes a first optical head 134, irradiates the first fluorescence detection region 12a of the channel 12 with first excitation light (blue light) having a center wavelength of about 470 nm and a wavelength range of about 450 to 490 nm, and detects first fluorescence (green light) having a center wavelength of about 530 nm and a wavelength range of about 510 to 550 nm.

The second fluorescence detection device 132 is formed to be able to detect fluorescence from a sample containing ROX as a fluorescent dye. The second fluorescence detection device 132 includes a second optical head 135, irradiates the second fluorescence detection region 12b of the channel 12 with second excitation light (green light) having a center wavelength of about 530 nm and a wavelength range of about 510 to 550 nm, and detects second fluorescence (red light) having a center wavelength of about 610 nm and a wavelength range of about 580 to 640 nm.

The third fluorescence detection device 133 is formed to be able to detect fluorescence from a sample containing Cy5 as a fluorescent dye. The third fluorescence detection device 133 includes a third optical head 136, irradiates the third fluorescence detection region 12c of the channel 12 with third excitation light (red light) having a center wavelength of about 630 nm and a wavelength range of about 610 to 650 nm, and detects third fluorescence (infrared light) having a center wavelength of about 690 nm and a wavelength range of about 660 to 720 nm.

The reaction processing apparatus 130 according to the present embodiment is characterized by the arrangement order of the optical heads of the three fluorescence detection devices. More specifically, the optical heads are arranged in the order of the second optical head 135 according to the second fluorescence detection device 132, the first optical head 134 according to the first fluorescence detection device 131, and the third optical head 136 according to the third fluorescence detection device 133 from the low temperature region side. In other words, the first optical head 134 is arranged in the center, the second optical head 135 is arranged on the low temperature region side of the first optical head 134, and the third optical head 136 is arranged on the high temperature region side of the first optical head 134. The position of the second fluorescence detection device 132 and the position of the third fluorescence detection device 133 may be switched. That is, the third optical head 136 may be arranged on the low temperature region side of the first optical head 134, and the second optical head 135 may be arranged on the high temperature region side of the first optical head 134.

As mentioned above, the interference between the fluorescence detection devices is caused by the overlap of the wavelength range of excitation light and the wavelength range of fluorescence. Therefore, when arranging a plurality of optical heads side by side, an arrangement is avoided in which the optical heads whose wavelength range of excitation light and the wavelength range of fluorescence overlap each other are adjacent to each other. For example, if the second optical head 135 is arranged in the center and the first optical head 134 and the third optical head 136 are arranged on the respective sides thereof, the wavelength range of the second excitation light according to the second optical head 135 (about 510 to 550 nm) and the wavelength range of the first fluorescent light of the first optical head 134 (about 510 to 550 nm) overlap. Further, the wavelength range of the second fluorescence (about 580 to 640 nm) according to the second optical head 135 and the wavelength range of the third fluorescence (about 610 to 650 nm) according to the third optical head 136 partially overlap. In this case, interference is likely to occur between the first fluorescence detection device 131 and the second fluorescence detection device 132 and between the second fluorescence detection device 132 and the third fluorescence detection device 133.

On the other hand, when the first optical head 134 is arranged in the center and the second optical head 135 and the third optical head 136 are arranged on the respective sides thereof as in the present embodiment, the second optical head 135 and the third optical head 136 are separated. Therefore, interference between the second fluorescence detection device 132 and the third fluorescence detection device 133 can be made less likely to occur.

Alternatively, the third optical head 136 may be arranged in the center, and the first optical head 134 and the second optical head 135 may be arranged on the respective sides thereof. In this case also, the first optical head 134 and the second optical head 135 are separated from each other. Therefore, interference between the first fluorescence detection device 131 and the second fluorescence detection device 132 can be made less likely to occur.

In the reaction processing apparatus, there are cases where the fluctuation of the fluorescence intensity according to any one of the plurality of fluorescence detection devices is used as a parameter for controlling the movement of the sample (displacement and stopping of the sample) that repeatedly moves in a reciprocating manner in the channel. The optical head of the fluorescence detection device used for such a purpose is desirably arranged at a substantially intermediate point of the connection region between the high temperature region and the low temperature region in the channel. If the optical head used for controlling the movement of the sample is arranged closer to either side of the high temperature region or the low temperature region of the connection region of the channel than the other, the control of the liquid feeding and stopping of the feeding may become troublesome. Arranging the optical head used for controlling the movement of the sample substantially in the middle of the connection region of the channel makes it easy to control the liquid feeding and stopping of the sample. The ease of control also leads to an improvement in accuracy.

On the other hand, in a samples that is subjected to a reaction process such as PCR, it is often the case that a fluorescent dye that excites the sample with excitation light whose wavelength centers on about 470 nm, such as FAM, is added. By the excitation using light having a wavelength of about 470 nm, the corresponding fluorescence necessarily includes light having a wavelength of about 500 to 560 nm. This corresponds to the specification of the first fluorescence detection device 131, and as a result, a fluorescence detection device that has such excitation light/fluorescence wavelength characteristics is often used in a reaction processing apparatus.

Due to the above-mentioned circumstances, it is appropriate that the first optical head 134, which is arranged in the center of the three optical heads, is arranged at a substantially intermediate point C of the connection region of the channel 12. The above-mentioned circumstances also apply in the above-mentioned reaction processing apparatus 30 including only two fluorescence detection devices. That is, in the reaction processing apparatus 30 shown in FIG. 2, the first optical head 51 may be arranged at a substantially intermediate point C of the connection region of the channel 12.

Described above is an explanation based on the embodiments of the present invention. These embodiments are intended to be illustrative only, and it will be obvious to those skilled in the art that various modifications to constituting elements and processes could be developed and that such modifications are also within the scope of the present invention.

INDUSTRIAL APPLICABILITY

The present invention is applicable to a polymerase chain reaction (PCR).

SEQUENCE LISTING FREE TEXT

Sequence number 1: forward PCR primer
Sequence number 2: reverse PCR primer
Sequence number 3: Probe
[Sequence Listing] NSG-70058WO Sequence Listing.txt

What is claimed is:

1. A reaction processing apparatus comprising:
a reaction processing vessel in which a channel where a sample moves is formed;
a first fluorescence detection device that irradiates a sample inside a first fluorescence detection region set in the channel with first excitation light and also detects first fluorescence produced from the sample by the irradiation with the first excitation light; and
a second fluorescence detection device that irradiates a sample inside a second fluorescence detection region set in the channel with second excitation light and also detects second fluorescence produced from the sample by the irradiation with the second excitation light, wherein
the wavelength range of the first fluorescence and the wavelength range of the second excitation light overlap with each other at least partially,
the first excitation light and the second excitation light flash at a predetermined duty ratio, and
given that the duty ratio of the flashing of the first excitation light and the flashing of the second excitation light is d, the phase difference between the flashing of the first excitation light and the flashing of the second excitation light is set within a range of $2\pi(p_m-\Delta p_m)$ (rad) to $2\pi(p_m+\Delta p_m)$ (rad) or within a range of $2\pi[(1-p_m)-\Delta p_m]$ (rad) to $2\pi[(1-p_m)+\Delta p_m]$(rad), where $p_m=d-d^2$ and $\Delta p_m=0.01*p_m$.

2. The reaction processing apparatus according to claim 1, wherein
the first fluorescence detection device includes a first optical head that emits the first excitation light and receives the first fluorescence,
the second fluorescence detection device includes a second optical head that emits the second excitation light and receives the second fluorescence, and
when the respective numerical apertures of the first optical head and the second optical head are in a range of 0.07 to 0.23, the distance between the center of the first fluorescence detection region and the center of the second fluorescence detection region is set to 4 mm or more.

3. The reaction processing apparatus according to claim 1, wherein
the channel includes a first temperature region maintained at a first temperature, a second temperature region maintained at a second temperature higher than the first temperature, and a connection region connecting the first temperature region and the second temperature region,
the movement of a sample inside the channel is controlled based on a fluorescence signal detected by the first fluorescence detection device, and
the first fluorescence detection region is set at a substantially intermediate point of the connection region.

4. The reaction processing apparatus according to claim 1, wherein
the first fluorescence detection device emits blue light as the first excitation light and detects green light as the first fluorescence, and
the second fluorescence detection device emits green light as the second excitation light and detects red light as the second fluorescence.

5. The reaction processing apparatus according to claim 4, further comprising:
a third fluorescence detection device that irradiates a sample inside a third fluorescence detection region set in the channel with third excitation light and also detects third fluorescence produced from the sample by the irradiation with the third excitation light, wherein
the third fluorescence detection device emits red light as the third excitation light and detects infrared light as the third fluorescence.

6. The reaction processing apparatus according to claim 5, wherein a first optical head of the first fluorescence detection device is arranged in the center and a second optical head of the second fluorescence detection device and a third optical head of the third fluorescence detection device are arranged on the respective sides of the first optical head.

7. A reaction processing apparatus comprising:
a reaction processing vessel in which a channel where a sample moves is formed;
a first fluorescence detection device that irradiates a sample inside a first fluorescence detection region set in the channel with first excitation light and also detects first fluorescence produced from the sample by the irradiation with the first excitation light; and
a second fluorescence detection device that irradiates a sample inside a second fluorescence detection region set in the channel with second excitation light and also detects second fluorescence produced from the sample by the irradiation with the second excitation light, wherein
the wavelength range of the first fluorescence and the wavelength range of the second excitation light overlap with each other at least partially,
the first excitation light and the second excitation light flash at a predetermined duty ratio,
given that the duty ratio of the flashing of the first excitation light and the flashing of the second excitation light is d, the phase difference between the flashing of the first excitation light and the flashing of the second excitation light is set within a range of $2\pi(p_m-\Delta p_m)$ (rad) to $2\pi(p_m+\Delta p_m)$ (rad) or within a range of $2\pi[(1-p_m)-\Delta p_m]$ (rad) to $2\pi[(1-p_m)+\Delta p_m]$(rad), where $p_m=d-d^2$ and $\Delta p_m=(d-d^2)/[k*(N_o')/V^1_0]$, $N_o'$ represents noise of a signal output of the first fluorescence detection device when the phase difference between the flashing of the first excitation light and the flashing of the second excitation light is 0 rad, $V^1_0$ represents a signal output of the first fluorescence detection device when the second fluorescence detection device is not operating, and k is 20.

8. The reaction processing apparatus according to claim 7, wherein k is 100/3.

9. The reaction processing apparatus according to claim 7, wherein k is 100.

* * * * *

SEQUENCE LISTING

```
<160> NUMBER OF SEQ ID NOS: 3

<210> SEQ ID NO 1
<211> LENGTH: 25
<212> TYPE: DNA
<213> ORGANISM: Artificial Sequence
<220> FEATURE:
<223> OTHER INFORMATION: Synthetic forward PCR primer

<400> SEQUENCE: 1
ggataatttg tttgcagttg atgtc                                              25

<210> SEQ ID NO 2
<211> LENGTH: 29
<212> TYPE: DNA
<213> ORGANISM: Artificial Sequence
<220> FEATURE:
<223> OTHER INFORMATION: Synthetic reverse PCR primer

<400> SEQUENCE: 2
caaatcctgt cacatataaa ttatttcgt                                          29

<210> SEQ ID NO 3
<211> LENGTH: 31
<212> TYPE: DNA
```

<213> ORGANISM: Artificial Sequence
<220> FEATURE:
<223> OTHER INFORMATION: Synthetic oligonucleotide probe

<400> SEQUENCE: 3
ccgtagatta ttaaaccgcc cttcctctgg a                                            31